United States Patent
Kiwan et al.

(10) Patent No.: US 11,313,310 B1
(45) Date of Patent: Apr. 26, 2022

(54) METHODS AND SYSTEMS FOR IMPROVING FUEL INJECTION REPEATABILITY

(71) Applicant: Ford Global Technologies, LLC, Dearborn, MI (US)

(72) Inventors: Rani Kiwan, Canton, MI (US); Ross Pursifull, Dearborn, MI (US); Joseph Lyle Thomas, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/302,496

(22) Filed: May 4, 2021

(51) Int. Cl.
*F02D 41/20* (2006.01)
*F02D 41/24* (2006.01)
*F02D 41/22* (2006.01)

(52) U.S. Cl.
CPC ......... *F02D 41/2467* (2013.01); *F02D 41/20* (2013.01); *F02D 41/221* (2013.01); *F02D 2041/2024* (2013.01); *F02D 2041/2027* (2013.01); *F02D 2041/2051* (2013.01); *F02D 2041/2055* (2013.01); *F02D 2041/2058* (2013.01); *F02D 2041/224* (2013.01); *F02D 2200/0602* (2013.01); *F02D 2200/0614* (2013.01); *F02D 2200/0616* (2013.01)

(58) Field of Classification Search
CPC ............. F02D 41/20; F02D 2041/2027; F02D 2041/2051; F02D 2041/2055; F02D 2041/2058; F02D 2041/224; F02D 2200/0602; F02D 2200/0614; F02D 2200/0616

USPC .......................................... 701/104; 123/490
See application file for complete search history.

(56) References Cited

U.S. PATENT DOCUMENTS

| | | | | |
|---|---|---|---|---|
| 4,653,447 A | * | 3/1987 | Linder | F02D 35/0007 123/357 |
| 5,835,330 A | * | 11/1998 | Kirschner | F02D 41/20 361/152 |
| 5,995,356 A | * | 11/1999 | Glavmo | F02D 41/20 361/154 |
| 6,250,285 B1 | | 6/2001 | Takase | |
| 6,463,910 B2 | | 10/2002 | Nishiyama | |
| 7,806,106 B2 | | 10/2010 | Cinpinski et al. | |
| 7,841,319 B2 | | 11/2010 | Thomas | |
| 8,935,114 B2 | | 1/2015 | Beer et al. | |

(Continued)

FOREIGN PATENT DOCUMENTS

DE 102016203191 A1 8/2017
EP 1136686 A2 9/2001

(Continued)

OTHER PUBLICATIONS

Campbell, I. et al., "Methods and Systems for Improving Fuel Injection," U.S. Appl. No. 17/203,606, filed Mar. 16, 2021, 32 pages.

(Continued)

*Primary Examiner* — Erick R Solis
(74) *Attorney, Agent, or Firm* — Geoffrey Brumbaugh; McCoy Russell LLP

(57) ABSTRACT

Methods and systems are provided for balancing a plurality of fuel injectors. In one example, a method includes determining a fuel injector error shape and applying a fueling correction to all injectors based on the fuel injector error shape.

16 Claims, 8 Drawing Sheets

(56) References Cited

U.S. PATENT DOCUMENTS

| | | |
|---|---|---|
| 9,074,552 B2 | 7/2015 | Shibata et al. |
| 9,412,508 B2 * | 8/2016 | Koch .................... H01F 7/1844 |
| 9,435,281 B2 | 9/2016 | Parrish et al. |
| 9,494,100 B2 | 11/2016 | Rösel |
| 9,593,637 B2 | 3/2017 | Surnilla et al. |
| 9,593,638 B2 | 3/2017 | Pursifull |
| 9,689,361 B2 | 6/2017 | Dames |
| 9,719,453 B2 | 8/2017 | Beer et al. |
| 9,932,947 B2 | 4/2018 | Nehl et al. |
| 9,945,316 B2 | 4/2018 | Sanborn et al. |
| 10,605,192 B2 | 3/2020 | Sanborn et al. |
| 2012/0043393 A1 | 2/2012 | Li et al. |
| 2016/0153390 A1 | 6/2016 | Ranga et al. |
| 2016/0281624 A1 * | 9/2016 | Dames .................... F02D 41/40 |
| 2020/0072113 A1 * | 3/2020 | Sykes .................... F01N 3/2066 |
| 2020/0116099 A1 * | 4/2020 | Surnilla .............. F02D 41/0085 |
| 2020/0291885 A1 | 9/2020 | Pursifull et al. |
| 2020/0300189 A1 | 9/2020 | Pursifull et al. |

FOREIGN PATENT DOCUMENTS

| | | |
|---|---|---|
| EP | 1647695 A2 | 4/2006 |
| WO | 2012156241 A2 | 11/2012 |

OTHER PUBLICATIONS

Pursifull, R. et al., "Methods and Systems for Compensating for Fuel Injector Closing Time," U.S. Appl. No. 17/204,254, filed Mar. 17, 2021, 43 pages.

Pursifull, R. et al., "Methods and Systems for Improving Fuel Injection Repeatability," U.S. Appl. No. 17/205,384, filed Mar. 18, 2021, 44 pages.

Kiwan, R. et al., "Methods and Systems for Controlling Fuel Injector Holding Current," U.S. Appl. No. 17/209,014, filed Mar. 22, 2021, 40 pages.

Kiwan, R. et al., "Methods and Systems for Fuel Injector Balancing," U.S. Appl. No. 17/302,498, filed May 4, 2021, 54 pages.

* cited by examiner

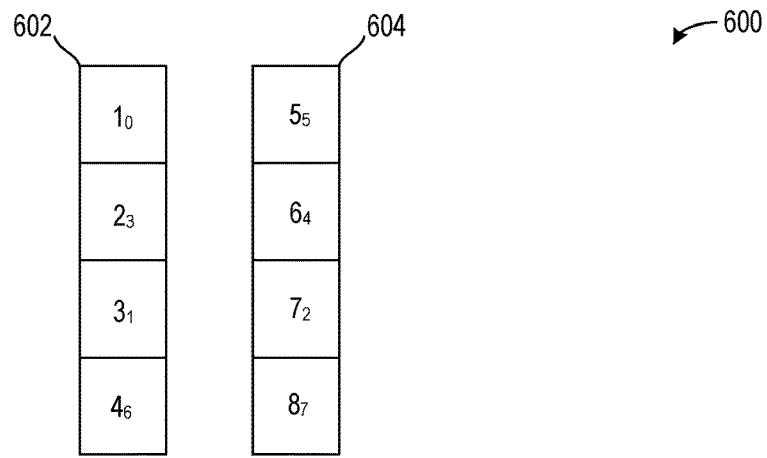

FIG. 6A

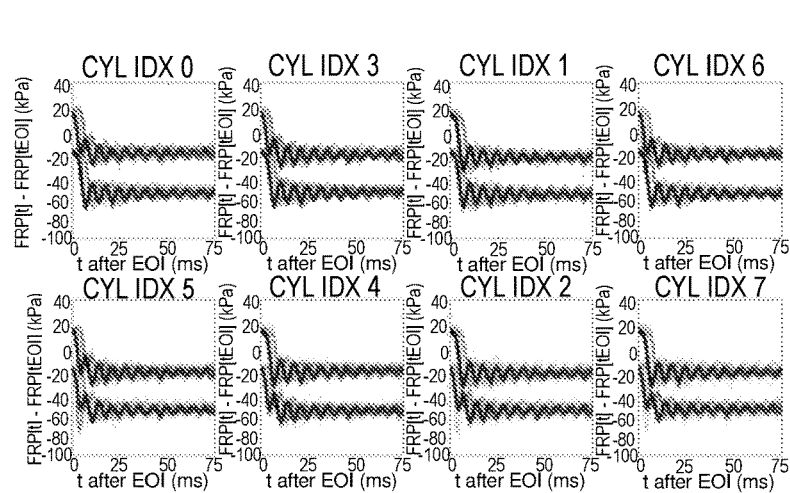

FIG. 6B

Set 0 : pump on; pump off 0 – [0-0-0 0] ... 31 injections, 30 included in PBIB
Set 1 : pump on; pump off 1 – [1-1-1-1]...31 injections, 30 included in PBIB
Set 2 : pump on; pump off 2 – [2-2-2-2]... 31 injections, 30 included in PBIB
Set 3 : pump on; pump off 3 – [3-3-3-3]... 31 injections, 30 included in PBIB
Set 4 : pump on; pump off 4 – [4-4-4-4]... 31 injections, 30 included in PBIB
Set 5 : pump on; pump off 5 – [5-5-5-5]... 31 injections, 30 included in PBIB
Set 6 : pump on; pump off 6 – [6-6-6-6]... 31 injections, 30 included in PBIB
Set 7 : pump on; pump off 7 – [7-7-7-7]... 31 injections, 30 included in PBIB

FIG. 6C

PW 1 : pump on; pump off 0 – [0-0-0 0] ... 31 injections, 30 included in PBIB
PW 2 : pump on; pump off 0 – [0-0-0 0] ... 31 injections, 30 included in PBIB
...
PW 61 : pump on; pump off 0 – [0-0-0 0] ... 31 injections, 30 included in PBIB

FIG. 6D

METHODS AND SYSTEMS FOR IMPROVING FUEL INJECTION REPEATABILITY

FIELD

The present description relates generally to systems and methods for improving accuracy of an amount of fuel that is injected to an engine via sensing a fuel rail pressure drop for at least one injector. The methods may be particularly useful for direct fuel injectors.

BACKGROUND/SUMMARY

Engines may be configured with direct fuel injectors (DI) for injecting fuel directly into an engine cylinder and/or port fuel injectors (PFI) for injecting fuel into an intake port of the engine cylinder. Fuel injectors may develop piece-to-piece variability over time due to imperfect manufacturing processes and/or injector aging, for example. Injector performance may degrade (e.g., injector becomes clogged) which may further increase piece-to-piece injector variability. Additionally or alternatively, injector to injector flow differences may lead to disparate injector aging between injectors. As a result, the actual amount of fuel injected to each cylinder of an engine may not be the desired amount and the difference between the actual and desired amounts may vary between injectors. Variability in a fuel injection amount between cylinders may result in reduced fuel economy, undesired tailpipe emissions, torque variation that causes a lack of perceived engine smoothness, and an overall decrease in engine efficiency. Engines operating with a dual injector system, such as dual fuel or PFDI systems, may have a higher number of fuel injectors resulting in greater possibility for injector variability. It may be desirable to balance the injectors so that all injectors inject the same, or in other words, have a similar error (e.g., all injectors at 1% under fueling).

Various approaches use fuel rail pressure drop across each injector to correct each injector's transfer function. One example approach is shown by Surnilla et al. in U.S. 2020/0116099. Therein, fuel rail pressure samples collected during a noisy zone of injector operation are discarded while samples collected during a quiet zone are averaged to determine an injector pressure. The injector pressure is then used to infer injection volume, injector error, and update an injector transfer function. Another example approach is shown by Surnilla et al. in U.S. Pat. No. 9,593,637. Therein, a fuel injection amount for an injector is determined based on a difference in fuel rail pressure (FRP) measured before injector firing and FRP after injector firing.

However, the inventors herein have recognized potential issues with such systems. As one example, average inter-injection pressure is used to estimate the fuel rail pressure drop across each injector even for engines with a higher number of cylinders and corresponding injection events. The inter-injection period may be based on factors such as number of cylinders, engine speed, and injection pulse width. During some diagnostic conditions, an amount of time in which conditions are met may be relatively short. Thus, selectively using some examples and discarding others is not only complex, but prolongs an amount of time needed to learn and correct injector fueling errors.

The inventors herein have recognized the above-mentioned disadvantages and have developed a method for adjusting a fuel injection parameter in response to a fuel rail pressure drop of a group of injectors at a first pulse-width. In this way, an injector transfer function shape may be learned and applied to all direct injectors.

As one example, the injector transfer function shape may be learned via a fuel rail pressure (FRP) drop sensed during a PBIB diagnostic. The injector transfer function shape, which may be based on a single calculated pressure drop over a plurality of direct injections, may provide a shape common to all injectors. As such, a number of injections used for learning the shape may be reduced, which may increase a rate of PBIB learning. The plurality of injections may be provided by a single injector or via a plurality of injectors. By doing this, a number of operating conditions in which PBIB learning may be executed is increased, which may enhance injector fueling more quickly.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6A shows an engine with two cylinder banks and indexed cylinder numbers based on a normal injection pattern.

FIG. 6B shows a resonance pressure effect on a fuel rail pressure for a fuel injection preceded by a fuel injection of a different or a same cylinder bank.

FIG. 6C shows a first example of an adjusted fuel injection pattern determining the transfer function shape.

FIG. 6D shows a second example of an adjusted fuel injection pattern for determining the transfer function shape.

DETAILED DESCRIPTION

The following description relates to systems and methods for determining a transfer function shape for a plurality of injectors via a PBIB diagnostic. The transfer function shape, which may be substantially identical for a group of similar injectors of an engine, such as the engine of FIG. 1, may be learned. The PBIB diagnostic may learn a drop in FRP for a fuel system, such as the fuel system of FIG. 2.

Figure 3A:
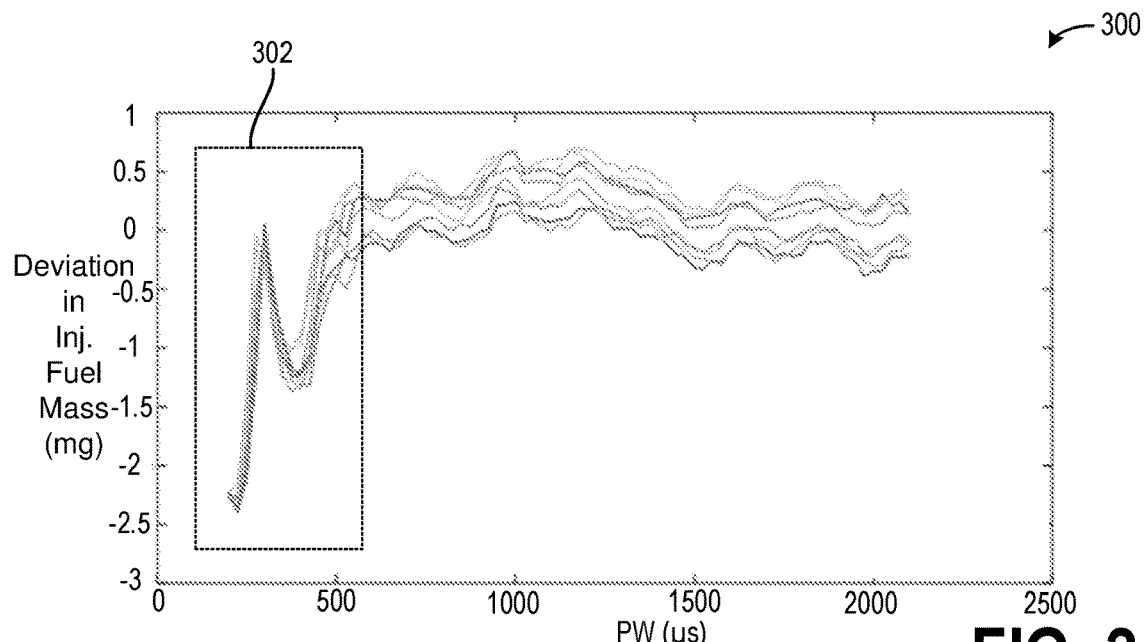
FIG. 3A shows a transfer function shape for a plurality of injectors.
Figure 3B:
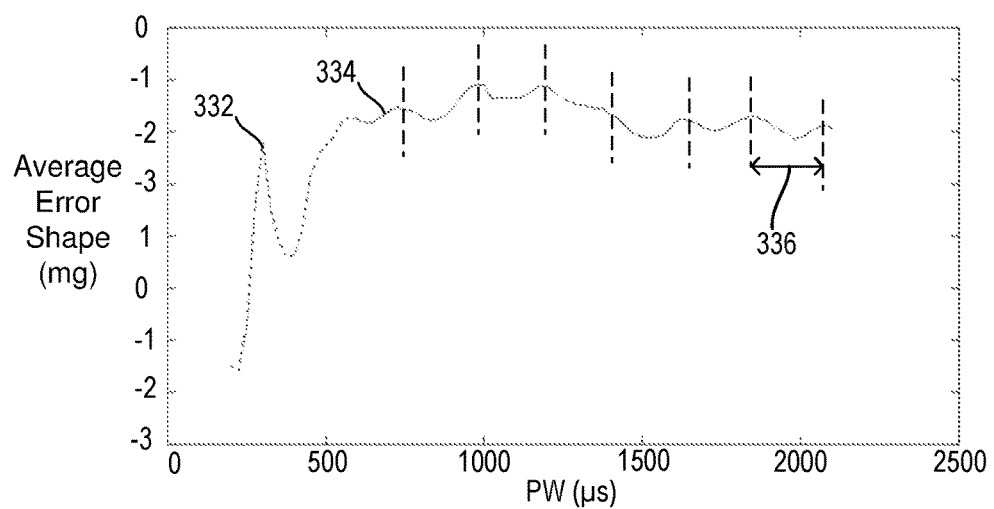
FIG. 3B shows an average transfer function shape for the plurality of injectors.
Figure 3C:
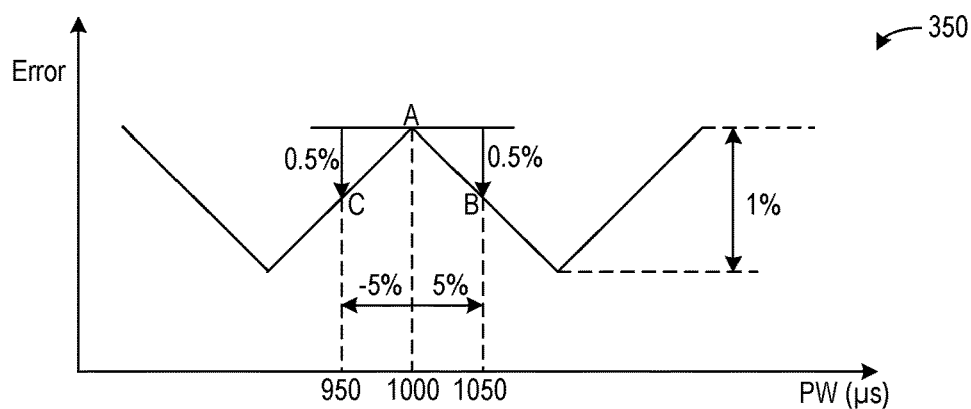
FIG. 3C shows a period of the transfer function shape along with example fueling corrections without knowing the transfer function shape.

In one example of the present disclosure, the PBIB diagnostic may learn the injector transfer function shape. Transfer function shapes of a plurality of injectors are shown in FIG. 3A and an average injector transfer function shape is shown in FIG. 3B. The injector transfer function shape may be a zig-zag shape following a threshold PW, the zig-zag shape and its periodicity are shown in FIG. 3C.

Figure 4:
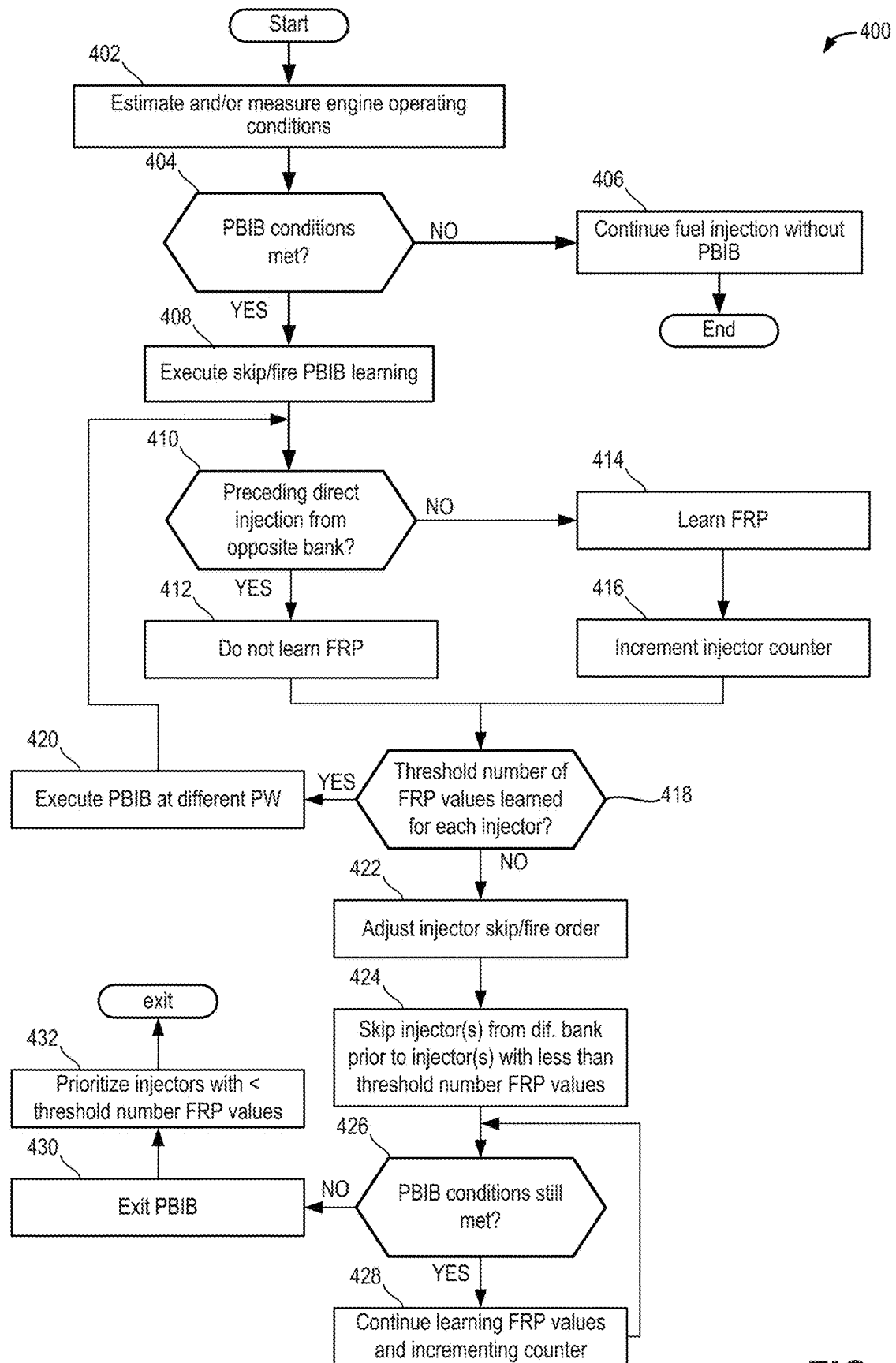
FIG. 4 shows a method for adjusting a fuel injection pattern during a fuel injector diagnostic.
Figure 5:
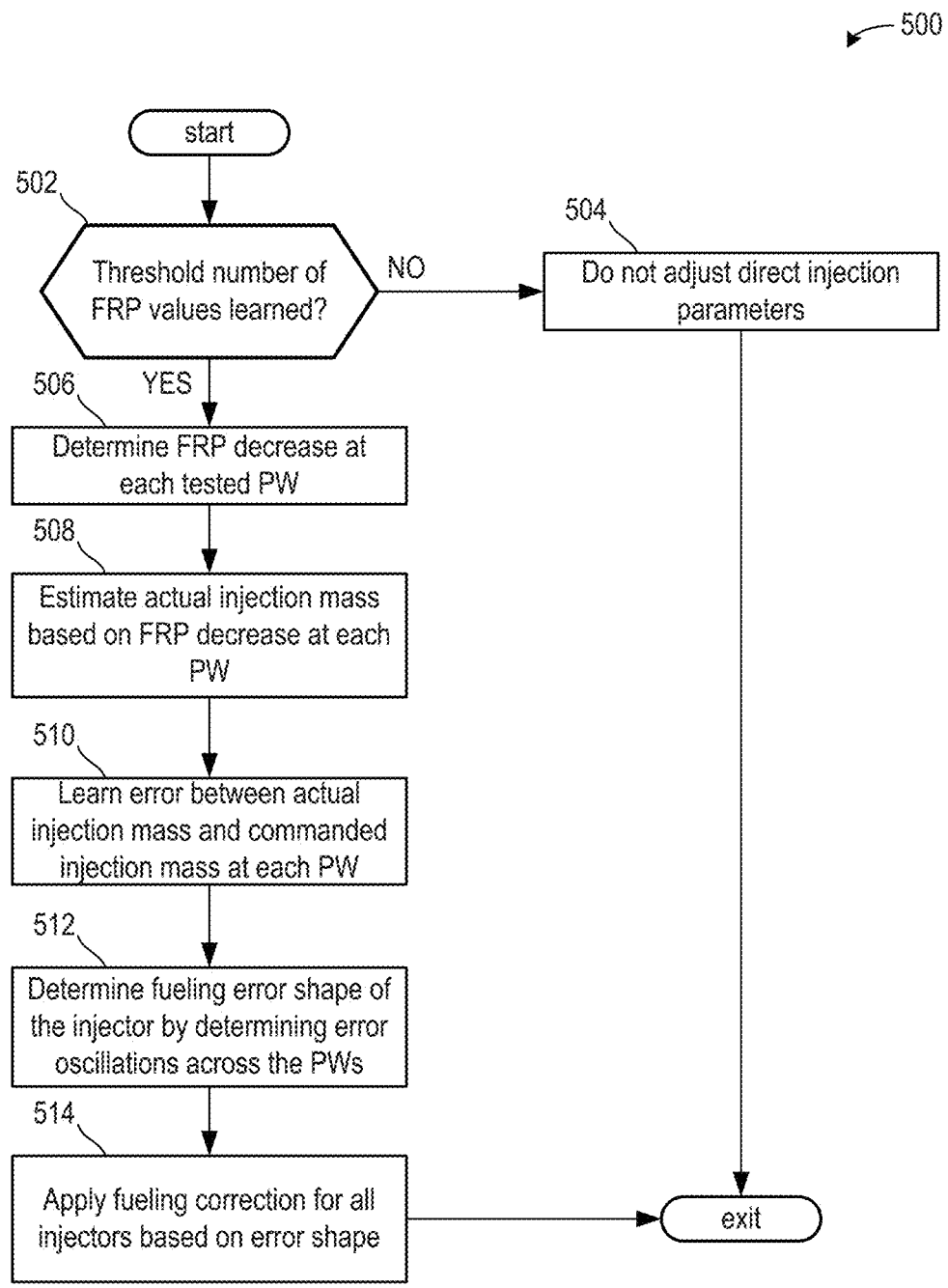
FIG. 5 shows a method for adjusting fuel injection parameters based on data acquired during the method of FIG. 4.

In one embodiment, the PBIB diagnostic may include adjusting an injection pattern to minimize opposite fuel rail pressure oscillations to minimize noise during the PBIB diagnostic. In one example, same cylinder bank injections are prioritized and injections from an opposite cylinder bank, which would otherwise interrupt a consecutive firing of same cylinder bank injections are skipped. A method for adjusting a fuel injection pattern during PBIB is shown in FIG. 4. A method for learning an injector transfer function shape based on an inter-injection PBIB drop is shown in FIG. 5. An example traditional injection pattern for injectors of separate cylinder banks is shown in FIG. 6A. Herein, the traditional injection pattern corresponds to an injection pattern of the fuel injectors outside of the PBIB diagnostic. FIG. 6B illustrates a pressure resonance effect on an inter-injection period of a fuel injection preceded by either a same cylinder injection or an opposite cylinder bank injection. FIGS. 6C and 6D illustrate different injection patterns for determining the injector transfer function shape.

Figure 7:
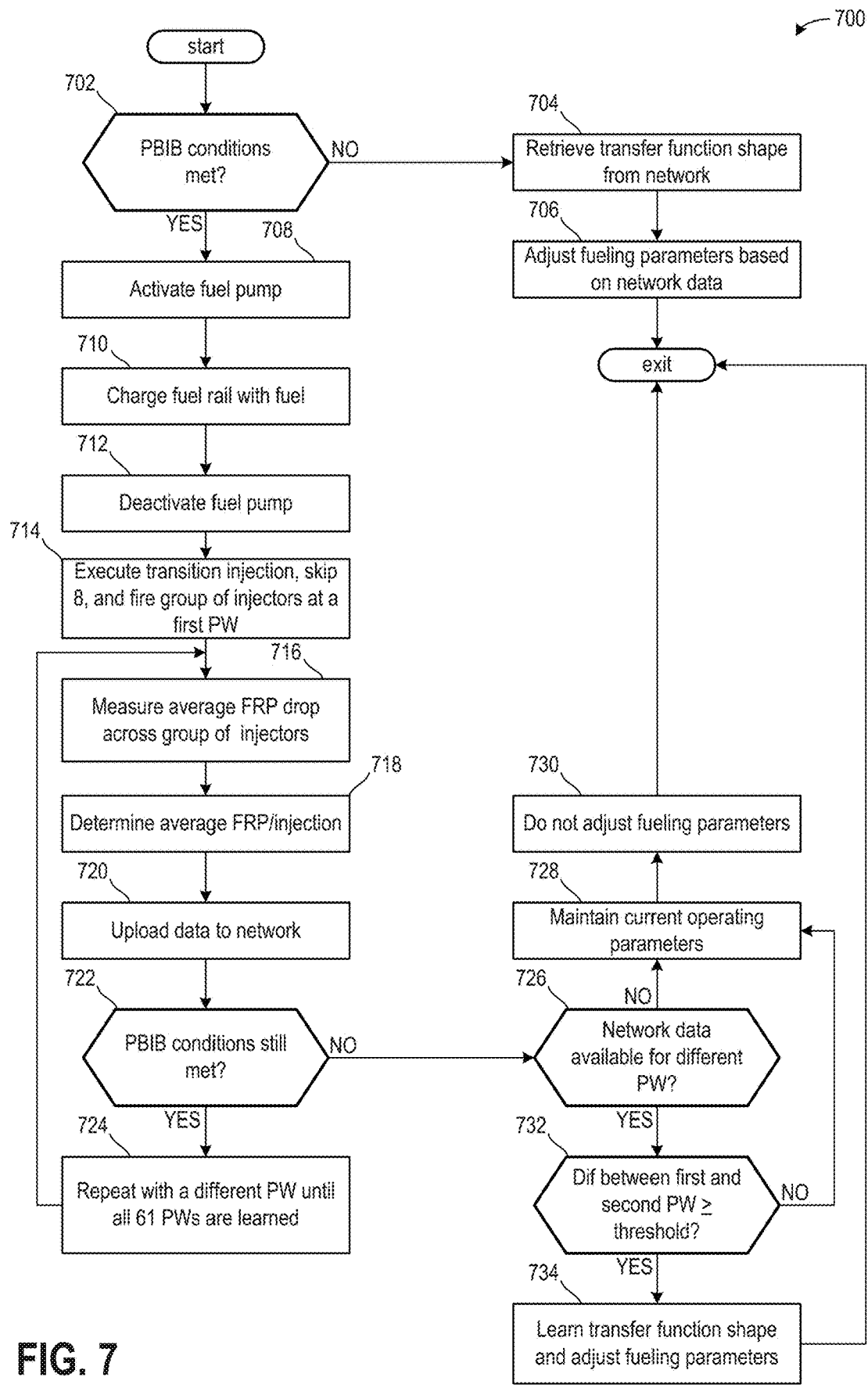
FIG. 7 shows a method for learning an injector transfer function shape by calculating a single FRP drop over a group of injections.
Figure 8:
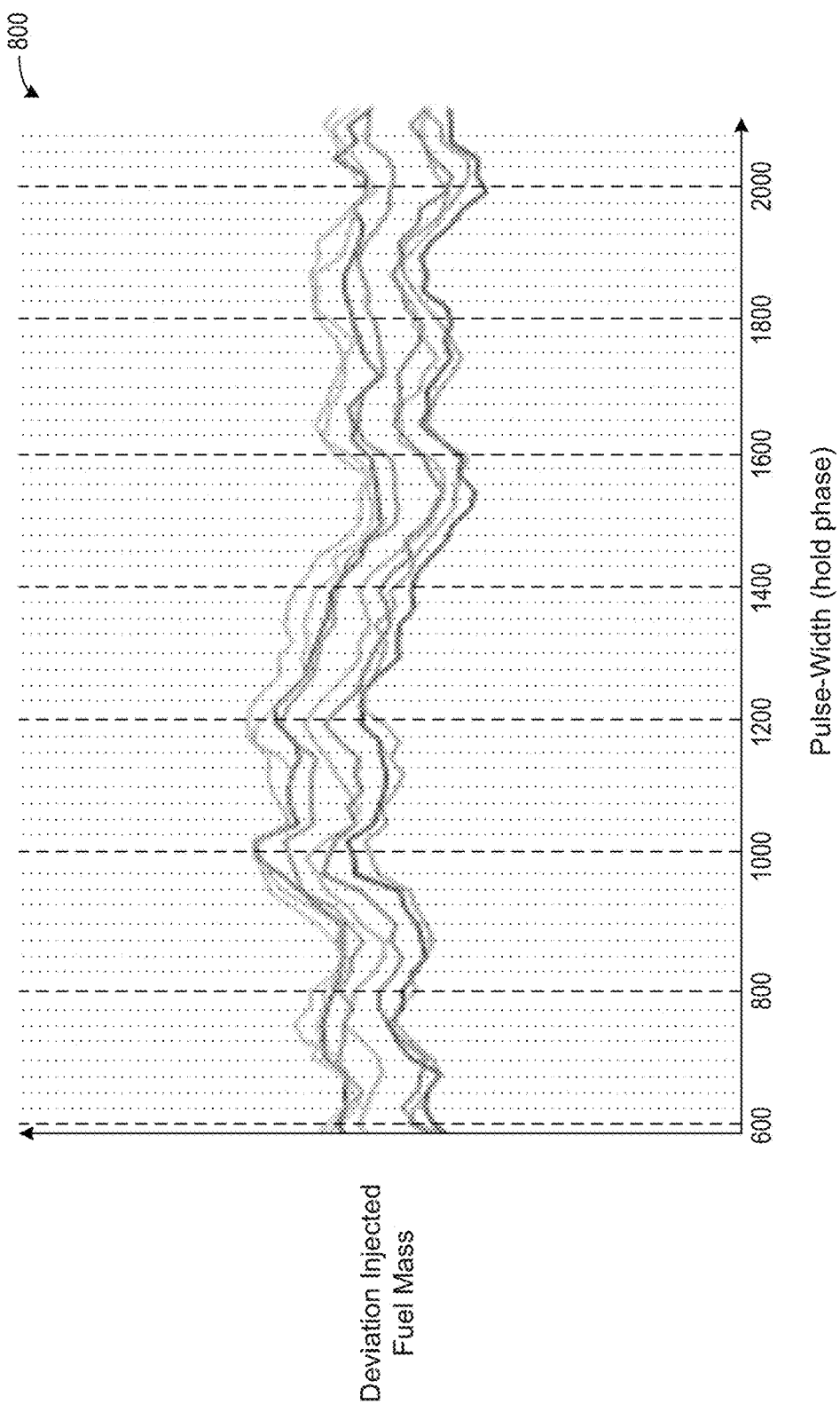
FIG. 8 shows a graph illustrating a plurality of PWs at which a drop in FRP is learned to determine the transfer function shape via an example adjusted fuel injection pattern.

In another embodiment, the PBIB diagnostic may include maintaining a portion of the traditional injection pattern. The PBIB diagnostic may be configured to learn a single drop in FRP across a plurality of injections executed by one or more injectors, the injector transfer function corresponding to a hold phase of the one or more injectors. An injector transfer function shape may be learned based on the single drop in FRP, wherein the injector transfer function shape may be accurate for all of the plurality of injectors similar to the one or more injectors. In one example, the injectors are direct injectors. A method for executing the PBM diagnostic for learning the single drop in FRP across a plurality of injections is shown in FIG. 7. A graph illustrating a zig-zag transfer function shape along with periodicities at which desired PWs for learning the transfer function shapes is shown in FIG. 8.

Herein, the present disclosure relates to determining an injector transfer function shape. The injector transfer function shape may be interchangeably referred to as a deviation in injected fuel mass shape, an error shape, an injector error shape, or the like. The injector transfer function shape may be utilized during conditions where measurement of an injector current is unavailable, wherein fueling errors are corrected based on the injector transfer function shape, described in greater detail below.

DI injectors may include common characteristics (e.g. shape) and unique characteristics (e.g. slope, offset). One approach to the learn (via pressure drop resulting from an injection) all characteristics with injecting one injector at a time (perhaps multiple times) is one embodiment of the present disclosure. However, this process may demand a high number of injections. Another example approach to learn characteristics common to all injectors may include injecting all injectors (in groups) and thus reducing the time needed to find an injector transfer function shape. Reducing the number of in injections in shape determination is desired because tens of PWs may be evaluated to characterize shape while other characteristics may demand fewer PWs.

Figure 1:
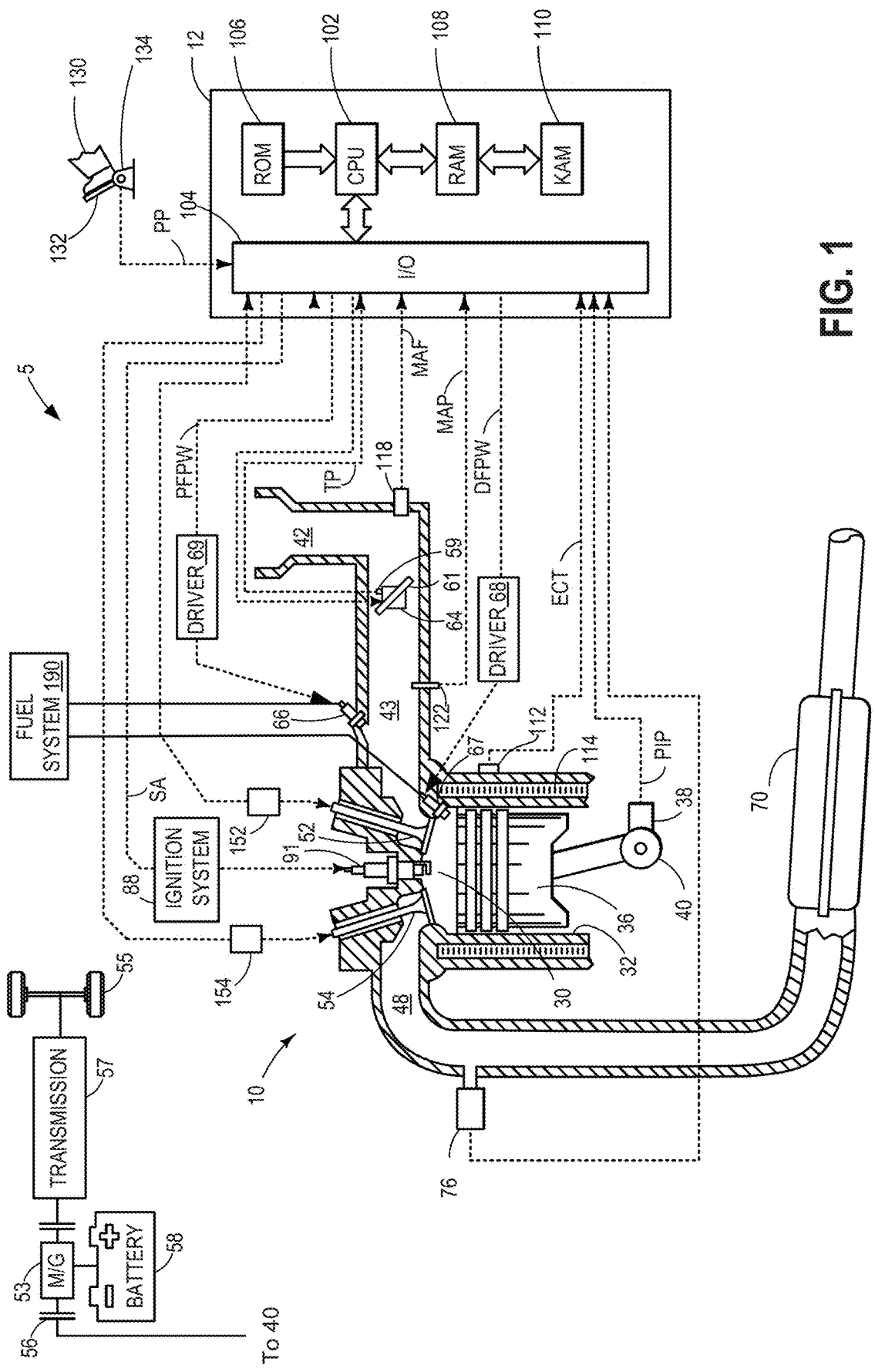
FIG. 1 shows a schematic depiction of an example propulsion system including an engine.
Figure 2:
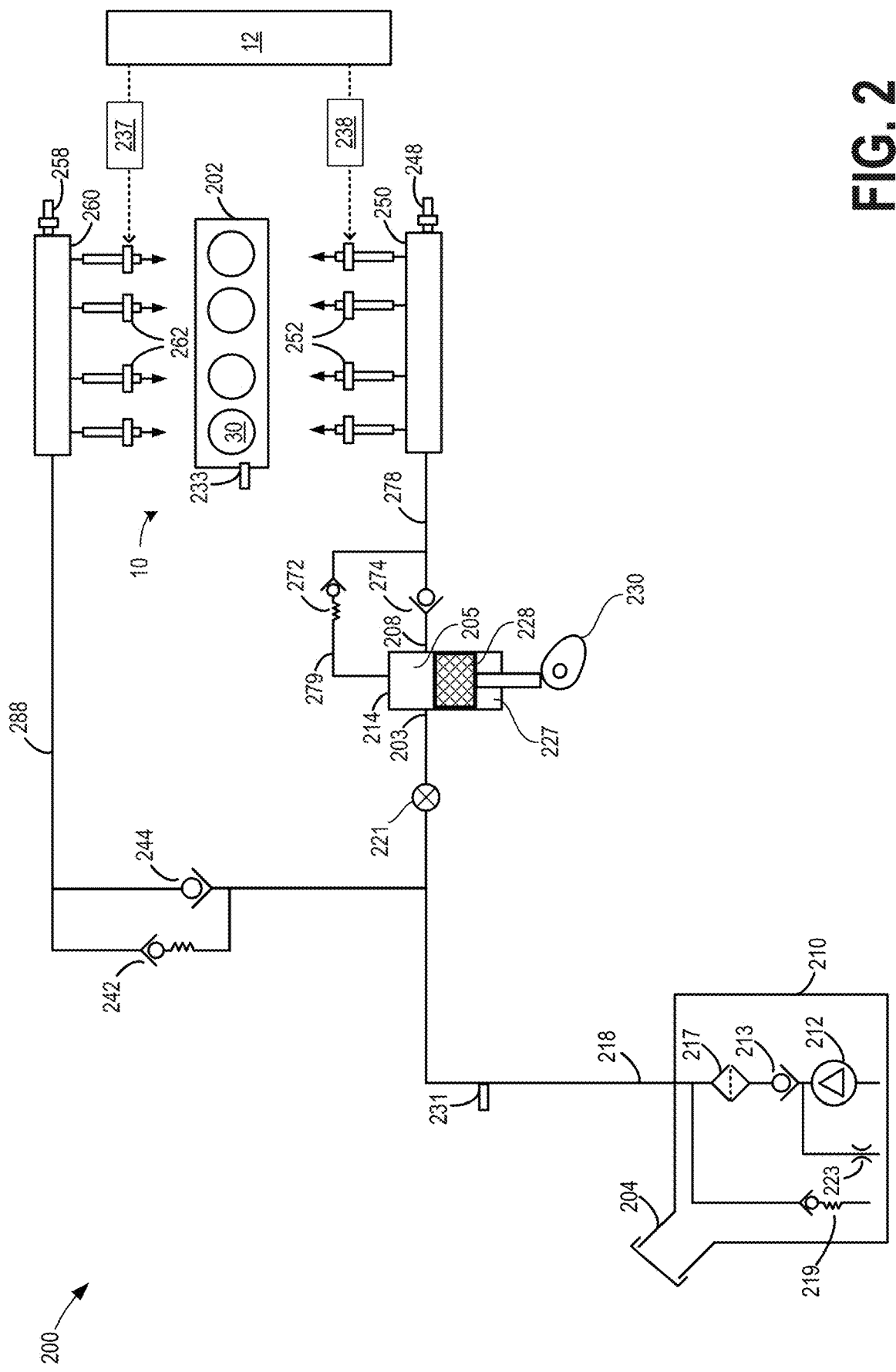
FIG. 2 shows an example fuel system coupled to the engine of FIG. 1.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a spark ignition internal combustion engine 10 with a dual injector system, where engine 10 is configured with both direct injection and port fuel injection. As such, engine 10 may be referred to as a port-fuel direct inject (PFDI) engine. Engine 10 may be included in a vehicle 5. Engine 10 comprises a plurality of cylinders of which one cylinder 30 (also known as combustion chamber 30) is shown in FIG. 1. Cylinder 30 of engine 10 is shown including combustion chamber walls 32 with piston 36 positioned therein and connected to crankshaft 40. A starter motor (not shown) may be coupled to crankshaft 40 via a flywheel (not shown), or alternatively, direct engine starting may be used.

Combustion chamber 30 is shown communicating with intake manifold 43 and exhaust manifold 48 via intake valve 52 and exhaust valve 54, respectively. In addition, intake manifold 43 is shown with throttle 64 which adjusts a position of throttle plate 61 to control airflow from intake passage 42.

Intake valve 52 may be operated by controller 12 via actuator 152. Similarly, exhaust valve 54 may be activated by controller 12 via actuator 154. During some conditions, controller 12 may vary the signals provided to actuators 152 and 154 to control the opening and closing of the respective intake and exhaust valves. The position of intake valve 52 and exhaust valve 54 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In another embodiment, four valves per cylinder may be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

In some embodiments, each cylinder of engine 10 may be configured with one or more fuel injectors for providing fuel thereto. As shown in FIG. 1, cylinder 30 includes two fuel injectors, 66 and 67. Fuel injector 67 is shown directly coupled to combustion chamber 30 and positioned to directly inject therein in proportion to the pulse width of signal DFPW received from controller 12 via electronic driver 68. In this manner, direct fuel injector 67 provides what is known as direct injection (hereafter referred to as "DI") of fuel into combustion chamber 30. While FIG. 1 shows injector 67 as a side injector, it may also be located overhead of the piston, such as near the position of spark plug 91. Such a position may improve mixing and combustion due to the lower volatility of some alcohol based fuels. Alternatively, the injector may be located overhead and near the intake valve to improve mixing.

Fuel injector 66 is shown arranged in intake manifold 43 in a configuration that provides what is known as port injection of fuel (hereafter referred to as "PFI") into the intake port upstream of cylinder 30 rather than directly into cylinder 30. Port fuel injector 66 delivers injected fuel in proportion to the pulse width of signal PFPW received from controller 12 via electronic driver 69.

Fuel may be delivered to fuel injectors 66 and 67 by a high pressure fuel system 190 including a fuel tank, fuel pumps, and fuel rails. Further, the fuel tank and rails may each have a pressure transducer providing a signal to controller 12. In this example, both direct fuel injector 67 and port fuel injector 66 are shown. However, certain engines may include only one kind of fuel injector such as either direct fuel injector or port fuel injector. Fuel injection to each cylinder may be carried out via direct injectors (in absence of port injectors) or port direct injectors (in absence of direct injectors). An example fuel system including fuel pumps and injectors and fuel rails is elaborated on with reference to FIG. 2.

Returning to FIG. 1, exhaust gases flow through exhaust manifold 48 into emission control device 70 which can include multiple catalyst bricks, in one example. In another example, multiple emission control devices, each with multiple bricks, can be used. Emission control device 70 can be a three-way type catalyst in one example.

Exhaust gas sensor 76 is shown coupled to exhaust manifold 48 upstream of emission control device 70 (where sensor 76 can correspond to a variety of different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. A single exhaust gas sensor may serve 1, 2, 3, 4, 5, or other number of cylinders.

Distributorless ignition system 88 provides ignition spark to combustion chamber 30 via spark plug 91 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 66 during a compression stroke. In another example, a homogenous mixture may be formed by operating one or both of injectors 66 and 67 during an intake stroke (which may be open valve injection). In yet another example, a homogenous mixture may be formed by operating one or both of injectors 66 and 67 before an intake stroke (which may be closed valve injection). In still other examples, multiple injections from one or both of injectors 66 and 67 may be used during one or more strokes (e.g., intake, compression, exhaust, etc.). Even further examples may be where different injection timings and mixture formations are used under different conditions, as described below.

Controller 12 can control the amount of fuel delivered by fuel injectors 66 and 67 so that the homogeneous, stratified, or combined homogenous/stratified air/fuel mixture in chamber 30 can be selected to be at stoichiometry, a value rich of stoichiometry, or a value lean of stoichiometry. Further, controller 12 may be configured to adjust a fuel injection pattern of the fuel injectors 66 and 67 during a pressure-based injector balancing (PBIB) diagnostic. The controller 12 may include instructions that when executed cause the controller 12 to adjust an injection pattern to increase an occurrence of an injection being preceded by a same cylinder bank injection. Thus, the cylinder 30 may be one cylinder of a first cylinder bank, the engine 10 further comprising a second cylinder bank as illustrated in FIG. 6A. The controller 12 may be further configured to monitor a fuel rail pressure (FRP) of an inter-injection period during the PBIB diagnostic. In one example, the controller 12 may be configured to learn only FRPs of inter-injection periods for injections preceded by a same-cylinder bank injection while ignoring FRPs for injections preceded by an opposite-cylinder bank injection. Additionally or alternatively, the controller 12 may signal to skip injections from the opposite-cylinder bank, thereby increasing the occurrence of injections being preceded by a same-cylinder bank injection, which may increase a rate in which FRP data is accrued.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 43 via an EGR valve (not shown). Alternatively, a portion of combustion gases may be retained in the combustion chambers by controlling exhaust valve timing.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 53. Electric machine 53 may be a motor or a motor/generator. Crankshaft 40 of engine 10 and electric machine 53 are connected via a transmission 57 to vehicle wheels 55 when one or more clutches 56 are engaged. In the depicted example, a first clutch 56 is provided between crankshaft 40 and electric machine 53, and a second clutch 56 is provided between electric machine 53 and transmission 57. Controller 12 may send a signal to an actuator of each clutch 56 to engage or disengage the clutch, so as to connect or disconnect crankshaft 40 from electric machine 53 and the components connected thereto, and/or connect or disconnect electric machine 53 from transmission 57 and the components connected thereto. Transmission 57 may be a gearbox, a planetary gear system, or another type of transmission. The powertrain may be configured in various manners including as a parallel, a series, or a series-parallel hybrid vehicle.

Electric machine 53 receives electrical power from a traction battery 58 to provide torque to vehicle wheels 55. Electric machine 53 may also be operated as a generator to provide electrical power to charge battery 58, for example during a braking operation.

Controller 12 is shown in FIG. 1 as a conventional microcomputer including: central processing unit (CPU) 102, input/output (I/O) ports 104, read-only memory (ROM) 106, random access memory (RAM) 108, keep alive memory (KAM) 110, and a conventional data bus. Controller 12 is shown receiving various signals from sensors coupled to engine 10, in addition to those signals previously discussed, including measurement of inducted mass air flow (MAF) from mass air flow sensor 118; engine coolant temperature (ECT) from temperature sensor 112 coupled to cooling sleeve 114; a profile ignition pickup signal (PIP) from Hall effect sensor 38 coupled to crankshaft 40; and throttle position TP from throttle position sensor 59 and an absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 38, which is also used as an engine speed sensor, produces a predetermined number of equally spaced pulses every revolution of the crankshaft. The controller 12 receives signals from the various sensors of FIG. 1 and employs the various actuators of FIG. 1, such as throttle 64, fuel injectors 66 and 67, spark plug 91, etc., to adjust engine operation based on the received signals and instructions stored on a memory of the controller. As one example, the controller may send a pulse width signal to the port injector and/or the direct injector to adjust a timing of fuel injection and an amount of fuel delivered to a cylinder via an injector.

FIG. 2 schematically depicts an example embodiment 200 of a fuel system, such as fuel system 190 of FIG. 1. Fuel system 200 may be operated to deliver fuel to an engine, such as engine 10 of FIG. 1. Fuel system 200 may be operated by a controller to perform some or all of the operations described with reference to the methods of FIGS. 4 and 5. Components previously introduced are similarly numbered in FIG. 2. Engine 10 is shown with cylinder 30 arranged in a cylinder bank 202. The cylinder bank 202 may be one of a plurality of cylinder banks of the engine 10, each of the banks identical in configuration.

Fuel system 200 includes a fuel storage tank 210 for storing the fuel on-board the vehicle, a lower pressure fuel pump (LPP) 212 (herein also referred to as fuel lift pump 212), and a higher pressure fuel pump (HPP) 214 (herein also referred to as fuel injection pump 214). Fuel may be provided to fuel tank 210 via fuel filling passage 204. In one example, LPP 212 may be an electrically-powered lower pressure fuel pump disposed at least partially within fuel tank 210. LPP 212 may be operated by a controller 12 (e.g., controller 12 of FIG. 1) to provide fuel to HPP 214 via fuel passage 218. LPP 212 can be configured as what may be referred to as a fuel lift pump. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller reduces the electrical power that is provided to lift pump 212, the volumetric flow rate and/or pressure increase across the lift pump may be reduced. The volumetric flow rate and/or pressure increase across the pump may be increased by increasing the electrical power that is provided to lift pump 212. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, the flow rate and pressure of the fuel provided at the inlet of the higher pressure fuel pump 214 is adjusted.

LPP 212 may be fluidly coupled to a filter 217, which may remove small impurities contained in the fuel that could potentially damage fuel handling components. A check valve 213, which may facilitate fuel delivery and maintain fuel line pressure, may be positioned fluidly upstream of filter 217. With check valve 213 upstream of the filter 217, the compliance of low-pressure passage 218 may be increased since the filter may be physically large in volume. Furthermore, a pressure relief valve 219 may be employed to limit the fuel pressure in low-pressure passage 218 (e.g., the output from lift pump 212). Relief valve 219 may include a ball and spring mechanism that seats and seals at a specified pressure differential, for example. The pressure differential set-point at which relief valve 219 may be configured to open may assume various suitable values; as a non-limiting example, the set-point may be 6.4 bar or 5 bar (g). An orifice 223 may be utilized to allow for air and/or fuel vapor to bleed out of the lift pump 212. This bleed at orifice 223 may also be used to power a jet pump used to transfer fuel from one location to another within the tank 210. In one example, an orifice check valve (not shown) may be placed in series with orifice 223. In some embodiments, fuel system 200 may include one or more (e.g., a series) of check valves fluidly coupled to low-pressure fuel pump 212 to impede fuel from leaking back upstream of the valves. In this context, upstream flow refers to fuel flow traveling from fuel rails 250, 260 towards LPP 212 while downstream flow refers to the nominal fuel flow direction from the LPP towards the HPP 214 and thereon to the fuel rails.

Fuel lifted by LPP 212 may be supplied at a lower pressure into a fuel passage 218 leading to an inlet 203 of HPP 214. HPP 214 may then deliver fuel into a first fuel rail 250 coupled to one or more fuel injectors of a first group of direct injectors 252 (herein also referred to as a plurality of first injectors). Fuel lifted by the LPP 212 may also be supplied to a second fuel rail 260 coupled to one or more fuel injectors of a second group of port injectors 262 (herein also referred to as a plurality of second injectors). HPP 214 may be operated to raise the pressure of fuel delivered to the first fuel rail above the lift pump pressure, with the first fuel rail coupled to the direct injector group operating with a high pressure. As a result, high pressure DI may be enabled while PFI may be operated at a lower pressure.

While each of first fuel rail 250 and second fuel rail 260 are shown dispensing fuel to four fuel injectors of the respective pluralities of first and second injectors 252, 262, it will be appreciated that each fuel rail 250, 260 may dispense fuel to any suitable number of fuel injectors. As one example, first fuel rail 250 may dispense fuel to one fuel injector of plurality of first injectors 252 for each cylinder of the engine while second fuel rail 260 may dispense fuel to one fuel injector of the plurality of second injectors 262 for each cylinder of the engine. Controller 12 can individually actuate each of the plurality of second injectors 262 via a port injection driver 237 and actuate each of the plurality of first injectors 252 via a direct injection driver 238. The controller 12, the drivers 237, 238 and other suitable engine system controllers can comprise a control system. While the drivers 237, 238 are shown external to the controller 12, it should be appreciated that in other examples, the controller 12 can include the drivers 237, 238 or can be configured to provide the functionality of the drivers 237, 238.

HPP 214 may be an engine-driven, positive-displacement pump. As one non-limiting example, HPP 214 may be a Bosch HDP5 high pressure pump, which utilizes a solenoid activated control valve (e.g., fuel volume regulator, magnetic solenoid valve, etc.) to vary the effective pump volume of each pump stroke. The outlet check valve of HPP is mechanically controlled and not electronically controlled by an external controller. HPP 214 may be mechanically driven by the engine in contrast to the motor driven LPP 212. HPP 214 includes a pump piston 228, a pump compression chamber 205 (herein also referred to as compression chamber), and a step-room 227. Pump piston 228 receives a mechanical input from the engine crank shaft or cam shaft via cam 230, thereby operating the HPP according to the principle of a cam-driven single-cylinder pump.

A lift pump fuel pressure sensor 231 may be positioned along fuel passage 218 between lift pump 212 and higher pressure fuel pump 214. In this configuration, readings from sensor 231 may be interpreted as indications of the fuel pressure of lift pump 212 (e.g., the outlet fuel pressure of the lift pump) and/or of the inlet pressure of higher pressure fuel pump. Readings from sensor 231 may be used to assess the operation of various components in fuel system 200, to determine whether sufficient fuel pressure is provided to higher pressure fuel pump 214 so that the higher pressure fuel pump ingests liquid fuel and not fuel vapor, and/or to minimize the average electrical power supplied to lift pump 212.

First fuel rail 250 includes a first fuel rail pressure sensor 248 for providing an indication of direct injection fuel rail pressure to the controller 12. Likewise, second fuel rail 260 includes a second fuel rail pressure sensor 258 for providing an indication of port injection fuel rail pressure to the controller 12. An engine speed sensor 233 (or an engine angular position sensor from which speed is deduced) can be used to provide an indication of engine speed to the controller 12. The indication of engine speed can be used to identify the speed of higher pressure fuel pump 214, since the pump 214 is mechanically driven by the engine, for example, via the crankshaft or camshaft. A solenoid controlled valve 221 may be included on the inlet side of pump 214. This solenoid controlled valve 221 may have two positions, a first pass through position and a second checked position. In the pass through position, no net pumping into the fuel rail 250 occurs. In the checked position, pumping occurs on the compression stroke of plunger/piston 228. This solenoid valve 221 is synchronously controlled with its drive cam to modulate the fuel quantity pumped into fuel rail 260.

First fuel rail 250 is coupled to an outlet 208 of HPP 214 along fuel passage 278. A check valve 274 and a pressure relief valve (also known as pump relief valve) 272 may be positioned between the outlet 208 of the HPP 214 and the first (DI) fuel rail 250. The pump relief valve 272 may be coupled to a bypass passage 279 of the fuel passage 278. Outlet check valve 274 opens to allow fuel to flow from the high pressure pump outlet 208 into a fuel rail only when a pressure at the outlet of direct injection fuel pump 214 (e.g., a compression chamber outlet pressure) is higher than the fuel rail pressure. The pump relief valve 272 may limit the pressure in fuel passage 278, downstream of HPP 214 and upstream of first fuel rail 250. For example, pump relief valve 272 may limit the pressure in fuel passage 278 to 200 bar. Pump relief valve 272 allows fuel flow out of the DI fuel rail 250 toward pump outlet 208 when the fuel rail pressure is greater than a predetermined pressure. Valves 244 and 242 work in conjunction to keep the low pressure fuel rail 260 pressurized to a pre-determined low pressure. Pressure relief valve 242 helps limit the pressure that can build in fuel rail 260 due to thermal expansion of fuel.

Based on engine operating conditions, fuel may be delivered by one or more of the pluralities of first and second injectors 252, 262. For example, during high load conditions, fuel may be delivered to a cylinder on a given engine cycle via only direct injection, wherein port injectors 262 are disabled (e.g., not injecting fuel). In another example, during mid-load conditions, fuel may be delivered to a cylinder on a given engine cycle via each of direct and port injection. As still another example, during low load conditions, engine starts, as well as warm idling conditions, fuel may be delivered to a cylinder on a given engine cycle via only port injection, wherein direct injectors 252 are disabled.

It is noted here that the high pressure pump 214 of FIG. 2 is presented as an illustrative example of one possible configuration for a high pressure pump. Components shown in FIG. 2 may be removed and/or changed while additional components not presently shown may be added to pump 214 while still maintaining the ability to deliver high-pressure fuel to a direct injection fuel rail and a port injection fuel rail.

Controller 12 can also control the operation of each of fuel pumps 212 and 214 to adjust an amount, pressure, flow rate, etc., of a fuel delivered to the engine. As one example, controller 12 can vary a pressure setting, a pump stroke amount, a pump duty cycle command, and/or fuel flow rate of the fuel pumps to deliver fuel to different locations of the fuel system. A driver (not shown) electronically coupled to controller 12 may be used to send a control signal to the low pressure pump, as required, to adjust the output (e.g., speed, flow output, and/or pressure) of the low pressure pump.

The fuel injectors may have injector-to-injector variability due to manufacturing, as well as due to age. Ideally, for improved fuel economy, injector balancing is desired wherein every cylinder has matching fuel injection amounts for matching fuel delivery commands. By balancing air and fuel injection into all cylinders, engine performance is improved. In particular, fuel injection balancing improves exhaust emission control via effects on exhaust catalyst operation. In addition, fuel injection balancing improves fuel economy because fueling richer or leaner than desired reduces fuel economy and results in an inappropriate ignition timing for the actual fuel-air ratio (relative to the desired ratio). Thus, getting to the intended relative fuel-air ratio has both a primary and secondary effect on maximizing the cylinder energy for the fuel investment.

Fueling errors can have various causes in addition to injector-to-injector variability. These include cylinder-to-cylinder misdistribution, shot-to-shot variation, and transient effects. In the case of injector-to-injector variability, each injector may include a different error between what is commanded to be dispensed and what is actually dispensed. As such, fuel injector balancing may result in an engine's torque evenness. Air and fuel evenness improves emission control.

In one example, during a PBIB diagnostic, one of the plurality of first injectors 252 or the plurality of second injectors 262 may be monitored. In one example, if the plurality of first injectors 252 is being balanced during the PBIB diagnostic, then the pump 214 may be sealed from the first fuel rail 250. Sealing the pump 214 from the first fuel rail 250 may include deactivating the pump 214, closing a valve, or the like. The PBIB diagnostic may further include adjusting an injection timing of the injectors such that injection overlap does not occur. Additionally or alternatively, an inter-injection period, which corresponds to a period of time between sequential injections, may meet a threshold duration, which may be based on a non-zero, positive number. The PBIB diagnostic may further include adjusting a fuel injection pattern such that only injections from a single cylinder bank occur. The FRP of the inter-injection period between injections of the same-cylinder bank may be learned by the controller and used to adjust an injector to injector variability. In some examples, FRPs of different cylinder banks may be learned, which may then be cumulatively used to correct injector to injector variability across multiple banks of the engine.

During balancing of the amount of fuel injected by a plurality of fuel injectors, a first fuel mass error of a second fuel injector may be estimated based on each of an estimated average fuel rail pressure during an inter-injection period between fuel injection by a first fuel injector and fuel injection by the second fuel injector and an estimated average fuel rail pressure during another inter-injection period between the fuel injection by the second fuel injector and fuel injection by a third fuel injector. Subsequent engine fueling may be adjusted based on the learned fuel mass errors.

In one example, a method may be executed in combination with the systems of FIGS. 1 and 2. The method may include adjusting a fuel injection pattern during a fuel injector diagnostic to inject fuel from only a plurality of first injectors of a first bank while skipping fuel injections from a plurality of second injectors of a second bank, as shown in the embodiments of FIGS. 4 and 5. The plurality of first injectors and the plurality of second injectors are direct injectors positioned to inject directly into combustion chambers of the first bank and the second bank, respectively. When fuel injections from the plurality of second injectors (e.g., direct injectors) of the second cylinder bank are skipped, port-fuel injectors of the second cylinder bank may be increased to compensate for the missing fuel. Combustion in the cylinders of the second bank may still occur during the skipping. A preceding and subsequent fuel rail pressure for each injection of the plurality of first injectors in the first cylinder bank may be learned and used to correct a fueling error across the injectors. The method may further include transitioning from injecting with only the first cylinder bank direct injectors to injecting with only the second cylinder bank direct injectors while skipping the first cylinder bank direct injectors. Thus, the first cylinder bank may be fueled via only port-fuel injectors following the transition. During the transition, a first direct injection of a direct injector of the second cylinder bank may be excluded from PBIB learning, and wherein subsequent FRPs following the first direction injection are learned. In one example, learned FRPs from each of the cylinder banks may be used to determine an average error across both banks, wherein a fueling correction may be based on the average error. Additionally or alternatively, the average error may be determined for each individual bank, or each individual injector.

Turning now to FIGS. 3A and 3B, they show first and second plots 300 and 325, respectively. First plot 300 graphs pulse-width (PW) along the abscissa and deviation in injected fuel mass along the ordinate. Dashed box 302 indicates a region including a ballistic period and a transition period of the fuel injection. In one example, the ballistic period, which may span from about 200 to 300 μs, may correspond to a period of an injection where an injector needle (e.g., a pintle) has not achieved full lift. The transition period, which may span from 300 to 600 μs, may be influenced by a rebound of the needle or an armature. The deviation in injected fuel mass may be based on a slope for an injected fuel mass for the plurality of injectors, 0 through 7, wherein cylinder index numbering 0 through 7 is described in greater detail with respect to FIG. 6A.

Following the ballistic/transition period (dashed box 302), the plurality of injectors shows a substantially similar shape in injected fuel mass deviation, but with different vertical offsets. Thus, while the values of the injected fuel mass deviations of the injectors may be different, a shape and an amount of the error for each injector may be substantially identical. In one example, the period following the ballistic/transition period corresponds to a holding phase of the injectors.

The second plot 325 illustrates an average error shape of the ballistic/transition period via dashed line 332 and after the ballistic/transition period via solid line 334. For the solid line 334, a peak-to-peak period 336 may be equal to approximately 200 μs. The peak-to-peak period 336 may be substantially identical for each of the injectors. Thus, for a given PW for all injectors, individual offsets may be sufficient to determine differences in a desired injected fuel mass and an actual injected fuel mass for all injectors. Thus, to learn the shape, different PWs may be commanded during PBIB to learn the injector error shape.

Turning now to FIG. 3C, it shows a plot 350 illustrating a portion of the zig-zag fuel injector error shape in the vicinity of PW=1000 µs. As an example, if the injector includes an error of −5% at PW=1000 µs, then the PW is increased by 5% to compensate for the error, moving from point A at PW=1000 µs to point B at PW=1050 µs. The PW increased by 50 µs moves the operating point from the peak of the zig-zag at point A to mid-way between the peak and a trough, due to the period of the zig-zag being about 200 µs. This may reduce the error due to the zig-zag by about 0.5%, since peak-to-peak amplitude is about 1% at PW=1000 µs. Thus, the fueling of the injectors is only increased by a total of 4.5% instead of 5%.

As another example, if the injector includes an error of 5% at PW=1000 µs. The PW may be decreased by 5% to compensate for the error, thereby moving the PW from point A to point C. Reducing the PW by 5% (e.g., 50 µs), the operating point from the peak of the zig-zag at point A is moved to mid-way between the peak and a trough at point C, resulting in an overall decrease in injector fueling being 5.5% instead of the desired 5%.

Thus, based on the example of FIG. 3C, a method for learning the zig-zag shape, which corresponds to an injector transfer function shape, is desired to accurately correct injector fueling errors. Herein, methods and systems are provided for learning the injector transfer function shape based on a drop (e.g., decrease) in FRP at different periods of the zig-zag shape. The shape may be learned during conditions where measurement of an injector current is unavailable. For example, to learn the injector transfer function shape, an instantaneous injector current may be needed, which may need expensive components and further demand increased packaging space. Thus, a model for learning the injector transfer function shape, as described herein, may be advantageous.

Turning now to FIG. 4, an example method for carrying out pressure based injector balancing (PBIB) diagnostic for the engine fuel injectors is shown at 400. The method enables the injection volume dispensed by the fuel injector on the given fuel injection event to be accurately determined and used for balancing injector errors. Instructions for carrying out method 400 may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 402, the method 400 includes estimating and/or measuring engine operating conditions. Engine operating conditions may include but are not limited to one or more of engine speed, torque demand, manifold pressure, manifold air flow, ambient conditions (ambient temperature, pressure, and humidity, for example), engine dilution, exhaust-gas recirculate (EGR flow rate), and the like.

At 404, the method 400 includes determining if pressure based injector balancing (PBIB) conditions are met for the engine fuel injectors (such as direct injectors 252 or port fuel injectors 262 in FIG. 2). PBIB learning may be performed to learn a variation in injector errors. As such, each injector may have an error between the commanded fuel mass to be delivered and the actual fuel mass that was delivered. By learning individual injector errors, the errors may be balanced so that all injectors move towards a common error value. PBIB learning may be performed at selected conditions such as when engine speed is lower than a threshold speed, while injector pulse-width (PW) is lower than a threshold PW, and when multiple injectors are not scheduled to deliver concurrently. At high engine speeds or large fuel pulse-widths the DI injection periods may overlap, thus substantially eliminating an inter-injection period. In one example, the threshold speed and the threshold speed and the threshold PW are based on non-zero, positive numbers. When injector overlap occurs, an inter-injection period ceases to exists, thereby disabling any PBIB learning from being performed. If PBIB conditions are not confirmed, then at 406, the method includes continuing fuel injection without performing PBIB.

If conditions are met for carrying out PBIB, then the method 400 may proceed to 408, which includes executing skip/fire PBIB learning. The skip/fire PBIB learning may include where some direct injectors are activated and some direct injectors are deactivated (e.g., skipped). In one example, the activation and deactivation is based on inter-bank injections. That is to say, for an engine comprising two or more cylinder banks, a direct injector injecting to a cylinder of a first bank may not be included in the PBIB learning if a preceding fuel injection occurred in a second bank different than the first bank. Said another way, in the example of FIG. 4, same cylinder bank injections are prioritized such that injections from an opposite cylinder bank are skipped to reduce pressure oscillations in a V-configured engine, with a cross-plane crank configuration, for example. As described above, the PWs used for executing the PBIB diagnostic for learning the injector transfer function shape excludes the ballistic/transition period, thus, the PBIB diagnostic may include where only PWs greater than a threshold PW are used. In one example, the threshold PW is equal to 600 µs. The skip/fire PBIB learning routine is described in greater detail herein.

The method 400 may proceed to 410, which includes determining if a preceding direct injection was provided from an injector of an opposite bank. As such, port-fuel injections may not affect a fuel rail pressure (FRP) of the direct injector fuel rail, as shown in FIG. 2. In one example, for an 8-cylinder engine arranged in a V configuration (e.g., a V-8), there may be two separate cylinder banks, a first cylinder bank including four cylinders and a second cylinder bank including a different four cylinders. Each of the cylinders may include a direct injector positioned to inject fuel directly into a combustion chamber thereof, as described above with respect to FIG. 2. A common high-pressure fuel rail may supply fuel to each of the fuel injectors. Direct injections may generate resonance pressure oscillations in the fuel rail, which may impact a sensing of the FRP, as described in greater detail with respect to FIG. 6B. More specifically, resonant pressure oscillations following a first direct injection from a direct injector of the first bank is out-of-phase compared to resonant pressure oscillations following a preceding second direct injection from a direct injector of the second (opposite) bank. The out-phase oscillations are amplified when computing the drop in FRP from the first direct injection (subtracting out-of-phase oscillations of similar amplitudes results in an oscillating pressure difference with approximately double the oscillation amplitude). Thus, if the preceding direct injection was from an injector of an opposite cylinder bank, then the method 400 may proceed to 412, which includes not learning the preceding and subsequent FRP for the injector currently injecting. Thus, an injector transfer shape may not be learned if a current injection is preceded by an opposite cylinder bank injection.

However, if the preceding direct injection is not from the opposite cylinder bank and thus is from the same cylinder bank, then the method 400 may proceed to 414, which includes learning the preceding and subsequent FRP for the injector current injecting. Resonant pressure oscillations following a first direct injection from a direct injector of the first bank is in-phase compared to resonant pressure oscillations from a preceding second direct injection from a direct injector of the first (same) bank. The in-phase oscillations cancel out when computing the drop in FRP from the first direct injection (subtracting in-phase oscillations of similar amplitudes results a pressure difference with approximately zero oscillations). The drop in FRP, based on a difference between the preceding and subsequent FRP of the injector currently injecting, may correspond to an actual amount of fuel injected by the direct injector. The drop in FRP may be compared to a desired amount of fuel injected to determine a direct injector error, which may correspond to the injector transfer function shape.

The method 400 may proceed to 416, which includes incrementing a learned FRP counter for the injector. In one example, the learned FRP counter increases only after a fuel rail pressure is learned following a direct injection of a single direct injector. As such, a counter may not be increased at 412.

Following 412 and 416, the method 400 may proceed to 418, which includes determining if a threshold number of FRP values is learned for each injector. The threshold number may be based on a non-zero, positive number. In one example, the threshold number is greater than or equal to two. Additionally or alternatively, the threshold number may be counted for a single PW at which the injector is injected. In some examples, additionally or alternatively, the PBIB diagnostic may include determining the threshold number of drops in FRP for a plurality of PWs with PW increments less than the period of the zig-zag shape. In one example, the injector transfer function shape may be learned by measuring drops in FRP at PW increments of 25 μs. If the threshold number of FRP values is learned for each injector at a single PW, then the method 400 may proceed to 420, which includes exiting PBIB. As such, direct injections may be executed based on, for example, engine load, and not PBIB diagnostics.

If the threshold number of FRP values is not learned for each injector, then the method 400 may proceed to 422, which includes adjusting an injector skip/fire order. In one example, the adjusting includes prioritizing direct injectors with a number of learned FRP values being less than the threshold number.

The method 400 may proceed to 424, which includes skipping injectors from an opposite bank prior to injecting with injectors with less than the threshold number of learned FRP values. Thus, if an injector of the first bank is short a number of learned FRP values relative to the threshold number, then an injector from the second bank scheduled to inject preceding the injector of the first bank may be skipped. Skipping the injector may include where the injector is deactivated and fuel is not injected therefrom. Thus, the port-fuel injector of the cylinder with the skipped direct injector may be signaled to inject all of a desired fuel amount. In this way, the fuel rail pressure may not decrease when an injector is skipped. Thus, the counter of the injector with less than the threshold number of learned FRP values may increase following its injection.

The method 400 may proceed to 426, which may include determining if PBIB conditions are still met. PBIB conditions are described above with respect to step 404.

If PBIB conditions are still met, the method 400 may proceed to 428, which includes continuing to learn FRP values and incrementing the counter for each injector in which an FRP value is learned. The method may continue to monitor if PBIB conditions are met.

If PBIB conditions are no longer met, then the method 400 may proceed to 430, which includes exiting PBIB. Exiting PBIB may include adjusting direct injection parameters as described above with respect to step 420.

The method 400 may proceed to 432, which includes prioritizing injectors with less than the threshold number of learned FRP values the next time PBIB conditions are met and PBIB learning resumes. The prioritizing may include adjusting an injector injection sequence to allow the direct injectors with less than the threshold number of learned FRP values to inject during conditions where an opposite bank injector is not injecting. By doing this, the drop in FRP values learned may be more accurate, which may enhance fueling corrections provided by the PBIB diagnostic based on the injector transfer function shape learned over multiple fueling errors determined at a plurality of PWs, thereby increasing engine power output and decreasing emissions.

Turning now to FIG. 5, it shows a method 500 for adjusting fueling parameters based on the learned FRP of method 400 of FIG. 4. In one example, method 500 is a sub-routine of the PBIB diagnostic of method 400 of FIG. 4. In one example, the PBIB diagnostic is configured to measure an actual fuel quantity injected and compare the actual fuel quantity to a desired or an intended fuel quantity. PBIB may then be used to reduce injector-to-injector variability, and may apply fueling corrections to inject equal amounts of fuel across all injectors of a single cylinder bank or multiple cylinder banks. In one example, the correction is applied to all cylinders, even if the transfer function shape, which corresponds to a fueling error shape during a hold phase of the injectors, is learned for only a single injector. As described above, following the threshold PW, the transfer function shape may be substantially similar to all injectors, thus, learning the transfer function for a single injector may lead to adjustments in fueling parameters for all injectors of the same cylinder bank and opposite cylinder bank, as will be described in greater detail below.

The method 500 begins at 502, which includes determining if the threshold number of FRP values is learned for at least one injector at a plurality of PWs greater than the threshold PW, similar to 418 of method 400. Additionally or alternatively, FRP values for different injectors at different PWs may be used to learn the injector fueling error. If the threshold number of FRP values is not learned for at least one injector at a plurality of PWs, then the method 500 may proceed to 504, which includes not adjusting direct injection parameters. Additionally or alternatively, a flag may be set to execute the PBIB diagnostic of FIG. 4 when conditions are met.

If the threshold number of FRP values are learned for one or more of the direct injectors at the plurality of PWs, then the method 500 may proceed to 506, which includes determining an average FRP decrease following each injection. The average FRP decrease may be determined for each individual injector or only one injector based on its learned FRP values according to the following equation (1):

$$\overline{\Delta FRP} = \frac{1}{n}\sum_{m=1}^{n} x_m \quad (1)$$

The method 500 may proceed to 508, which includes estimating an actual injection mass based on the average ΔFRP. In one example, a map correlating pressure drop with injection mass may be used for estimating the dispensed fuel mass. In one example, there may a linear relation between drop in fuel rail pressure over an injection event and the fuel mass dispensed by an injector during that injection event. In other examples, a model, transfer function, look-up table, or algorithm may be used to learn the dispensed fuel mass based on the pressure drop. The actual mass injected is further based on the bulk modulus of the fuel, the fuel density, and the fuel rail volume. In one example, the actual mass injected is determined as per equation (2):

Actual mass injected=($\overline{\Delta FRP}$/bulk modulus)*fuel rail volume*fuel density (2)

The method 500 may proceed to 510, which includes learning an error between the actual injection mass and the commanded injection masses for each of the injections from the injector at each PW of the plurality of PWs. An injector error between an intended injection mass that was commanded (based on the commanded duty cycle pulse width and average FRP at the time of the injection event) and the actual injection mass as computed from the pressure difference may be estimated. The computed difference in fuel mass is the injector error that is desired to be compensated for future injections (to balance injectors). Specifically, a fuel mass error for a given injector used to dispense fuel at the selected injection event is computed as a difference between the commanded fuel mass (determined based on commanded pulse-width) and the actual fuel mass (determined based on the measured pressure difference).

The method 500 may proceed to 512, which includes determining a fueling error shape of the at least one injector by determining error oscillations (e.g., peaks and troughs) across the PWs. For example, for errors learned at PWs greater than the threshold PW, a slope between neighboring PWs may be determined, wherein an overall error shape of the injector during a hold phase may be learned. For example, if errors are learned at increments of 25 μs from 600 μs to 2100 μs, then 61 different PW errors may be learned. A slope between errors values of closest PWs may be learned (e.g., a slope between 600 μs to 625 μs, and then from 625 μs to 650 μs, and so on) to determine an error shape (e.g., injector transfer function shape) of the injector. The method 500 may proceed to 514, which includes applying a fueling correction to all injectors based on the error shape of the at least one injector. The fueling correction being based on the difference between the actual injector transfer function shape and a desired injector transfer function shape, where the difference corresponds to the fueling error. If the actual injector transfer function shape is less than the desired injector transfer function shape at one or more PWs, then the PW may be increased. If the actual injector transfer function shape is greater than the desired injector transfer function shape at one or more other PWs, then the PW may be decreased. As such, the injector injecting parameters may be fine-tuned based on the methods of FIGS. 4 and 5.

In one example, the methods of FIGS. 4 and 5 may include periodically or continuously characterizing an injector and then adjusting an injector command such that all injectors are injecting substantially identical amounts of fuel once their pulse-width is adjusted. As another example, additionally or alternatively, an average error across groups of injectors may be corrected such that the difference between an actual fuel mass injected and an intended fuel mass injected is equal to about 0.

Turning now to FIG. 6A, it shows an embodiment of an engine 600 comprising a first cylinder bank 602 and a second cylinder bank 604. In one example, the first cylinder bank 602 is identical to the cylinder bank 202 of FIG. 2. Thus, the first cylinder bank 602 includes a plurality of port-fuel injectors (PFI) and a plurality of direct injectors (DI). The second cylinder bank 604 is identical to the first cylinder bank 602 in a number of cylinders and number of fuel injectors. In the example of FIG. 6A, the first cylinder bank 602 and the second cylinder bank 604 include an equal number of cylinders arranged in a V-8 configuration. The engine 600 may include a cross-plane crank or flat-plane crank. It will be appreciated that the engine 600 may include other configurations and numbers of cylinders without departing from the scope of the present disclosure. For example, the engine 600 may be a V-6 engine or a W-16 engine or other type of engine.

Cylinders of the first and second cylinder banks are numbered sequentially, wherein cylinders of the first cylinder bank 602 are numbered, 1, 2, 3, and 4 and cylinders of the second cylinder bank 604 are numbered 5, 6, 7, and 8. Subscript numbering, herein referred to as a cylinder index number, corresponds to an injection pattern of the direct injectors of the cylinders. For example, cylinder 1 of the first cylinder bank 602 may receive a direct injection before the other cylinders. Cylinder 3 of the first cylinder bank 602 may be the second cylinder to receive a direct injection, followed by cylinder 7 of the second cylinder bank 604, then cylinder 2 of the first bank 602, then cylinder 6 of the second cylinder bank 604, then cylinder 5 of the second bank, then cylinder 4 of the first bank 602, and lastly followed by cylinder 8 of the second bank 604. Thus, in the example of FIG. 6A, the traditional injection pattern is 1-3-7-2-6-5-4-8 during operating conditions outside of the PBIB diagnostic, wherein each of the injectors is configured to inject.

Turning now to FIG. 6B, it shows a plurality of graphs 625 illustrating FRP traces following preceding injections added to the set of FRP traces following current injections. In each graph of the plurality of graphs 625, the preceding injection FRP is the upper plot and the current injection FRP is the lower plot. In the example of FIG. 6B based on the injection pattern of FIG. 6A, six of the eight injections are preceded by an opposite bank injection. Said another way, six of the eight injections includes where a first cylinder bank injection precedes a second cylinder bank injection or vice-versa. These injections include cylinder index numbers 0, 3, and 6 for the first cylinder bank 602 and 2, 4, and 7 for the second cylinder bank 604. This results in the out-of-phase oscillations between the upper and lower plots of each graph of the plurality of graphs 625.

In one example, FIG. 6B illustrates the error that arises from taking the difference between average FRPs from different rails of different cylinder banks. The rails may include a naturally occurring oscillation between them that are out of phase. However, same cylinder bank oscillations of inter-injection FRP averages may be in-phase and subtracted in-phase, the error may be reduced and/or eliminated compared to subtracting anti-phase inter-injection FRP averages of rails of different cylinder banks.

In one example, when computing FRP drops, a measurement error, due to resonant oscillations, may cancel out when a previous injection is from the same cylinder bank.

This occurs in two out of the eight cylinders based on the injection pattern of FIG. 6A, wherein the upper and lower plots illustrate in-phase oscillations in the graphs corresponding to the cylinder index numbers 1 and 5. As illustrated, cylinder index number 1 of the first cylinder bank 602, preceded by cylinder index number 0, and cylinder index number 5 of the second cylinder bank 604, preceded by cylinder index number 4, are the only cylinders of the injection pattern of FIG. 6A in which a FRP drop may be learned with reduced error. That is to say, the measurement error may increase if a previous injection is from a different bank. In one example, the measurement error doubles if the injection is from a different bank.

In one example, a fuel injection pattern with six cylinders preceded by opposite bank cylinders and two cylinders preceded by same bank cylinders is expected on a V8 with cross-plane crankshaft. A V8 with flat-plane crankshaft on the other hand results in a pattern where all 8 cylinders are preceded by opposite bank cylinders (as firing order alternates fired cylinder between the 2 banks), thereby leading to errors on all cylinder PBIB measurements without adjusting an injection pattern.

In one example, averaging the FRP over an inter-injection period following a direct injection at a single PW from a direct injector from the first bank may result in a +4% error due to resonant pressure oscillations, and averaging the FRP over an inter-injection pressure following a direct injection from a direct injector from the second bank may result in a −4% error due resonant pressure oscillations with similar amplitudes with opposite phases. The oscillation amplitude determines the magnitude of the error (e.g. absolute value of error=4%) for a given inter-injection period, oscillation period, oscillation decay coefficient etc., while the oscillation phase determines the sign of the error (e.g. error >0 for the first bank and error <0 for the second bank).

The drop in FRP (AFRP) from a direct injection from cylinder index 2 of the second bank is computed by subtracting the average inter-injection FRP following the direct injection from cylinder index 2 of the second bank (with a −4% error) from the average inter-injection FRP following the preceding direct injection from cylinder index 1 of the (opposite) first bank (with a +4% error). The error in AFRP is doubled: Δerror=4%−(−4%)=8%.

The drop in FRP (AFRP) from a direction injection from cylinder index 5 of the second bank is computed by subtracting the average inter-injection FRP following the direct injection from cylinder index 5 of the second bank (with a −4% error) from the average inter-injection FRP following the preceding injection from cylinder index 4 of the (same) second bank (with a −4% error). The error in AFRP is cancelled: Δerror=(−4%)−(−4%)=0%.

Thus, as will be described herein, unconventional injection firing patterns may be incorporated to prioritize same cylinder bank injections for injections from an injector demanding a greater number of learned FRP values. In one example, only FRP drops with in-phase preceding and subsequent oscillations are included in PBIB calculations. Said another way, only FRP values from injector preceded by a same cylinder bank injection are included in PBIB learning in one embodiment of the present disclosure.

Turning now to FIG. 6C, it shows an example injection pattern 650. The injection pattern 650 may include where only preceding and subsequent FRP values of a single injector are measured (for each group of injections enclosed by brackets), resulting in a fire 1/skip 7 pattern. Cylinder index numbers in a dashed box may correspond to a transitional injection from one cylinder bank to another, wherein a drop in FRP of the transitional injection is not learned. FRP values for cylinder index numbers between brackets may be learned since a preceding injection was from a same cylinder bank (e.g., the transitional injection). Thus, in the example of FIG. 6C, each injector set includes where an individual injector is signaled to inject a plurality of times uninterrupted by injections from the other injectors. Thus, for set 0, the pump is on and primes the fuel rail, then the pump is switched off and the fuel rail is sealed via commanding a valve (e.g., solenoid valve 221) closed. The injector corresponding to cylinder index number 0 injects a first transitional injection and then may consecutively inject 30 times without an interruption from the injectors of cylinder index numbers 1-7. Thus, set 0 may span over 31 engine cycles, wherein 31 injections occur and 30 are included in PBIB learning. This process may be repeated for sets 1 through 7 at a same PW (one set per injector). Set 0 though set 7 may be repeated for different PWs.

Thus, the injection pattern of FIG. 6C may result in 15128 engine cycles, for 61 different PWs (e.g., 61 PWs tested×8 sets×31 injections per cylinder) spanning from 600 to 2100 μs at 25 μs intervals. The injection pattern of FIG. 6C, while reducing resonance oscillations of inter-bank injections, may be too time consuming during some operating conditions.

Turning now to FIG. 6D, it shows an injection pattern 675. Since the injector transfer function shape is common to all injectors, then the injection pattern of FIG. 6C may be adjusted to a less symmetric (e.g., based on fuel injector usage) fuel injection pattern where a single injector error shape may be learned and applied to all other direct injectors. For example, if all PWs tested during the PBIB diagnostic inject only the injector of cylinder index number 0, then cylinder index number 0 may be injected 31 times for each individual pulse width. Thus, the number of engine cycles may be reduced by eight times since only one cylinder injector is tested.

In one example, the injector for cylinder index number 0 may be learned at a plurality of PWs from 600 μs to 2100 μs with 25 μs increments: $e\_(0,600\ \mu s)$, $e\_(0,625\ \mu s)$, $e\_(0,650\ \mu s)$ . . . $e\_(0,2100\ \mu s)$, as shown in the example of FIG. 6D. Additionally or alternatively, learning the individual injector errors (offsets) at a single PW may be executed for all injectors. Using 1500 μs as an example single PW: $e\_(0, 1500\ \mu s)$ for injector 0, $e\_(1,1500\ \mu s)$ for injector 1 . . . $e\_(7,1500\ \mu s)$ for injector 7.

The common shape may now be computed for all injectors using the errors learned for injector 0 at a plurality of PWs as:

$$S(PW) = e\_(0, PW\ \mu s) - e\_(0, 1500\ \mu s) \quad \text{(equation 3)}$$

In equation 3 above, injector 0 individual offset learned at 1500 μs is subtracted from the errors learned at other PWs. 1500 μs is merely an example PW and other values are possible for learning each injector offset as long as it is the same PW (in the hold phase) for all injectors.

The error for any injector i as a function of PW can now be computed by adding the individual injector offset to the common shape based on equations 4 and 5 below.

$$e\_(i, PW\ \mu s) = e\_(i, 1500\ \mu s) + S(PW) \quad \text{(equation 4)}$$

$$e\_(i, PW\ \mu s) = e\_(i, 1500\ \mu s) + e\_(0, PW\ \mu s) - e\_(0, 1500\ \mu s) \quad \text{(equation 5)}$$

Turning now to FIG. 7, it shows a method 700 for determining an average fuel mass of a group of injectors to learn an error shape. In one example, the method 700 may determine an injector error shape more quickly than the injection patterns of FIGS. 6C and 6D, thereby improving engine fueling and performance. The method 700 may be further configured to determine a drop in FRP across all injectors with an injection pattern similar to the traditional injection pattern of FIG. 6A.

The method 700 begins at 702, which includes determining if PBIB conditions are met. Step 702 may be identical to step 404 of method 400 of FIG. 4. If PBIB conditions are not met, then the method 700 may proceed to 704, which includes receiving a transfer function shape (e.g., error shape) from a network. In one example and as will be described in greater detail below, PBIB data may be relayed to a network via the method 700. The network may include a processor or other logic device configured to receive PBIB feedback from one or more vehicles and send the PBIB feedback to other similar vehicles. Vehicle similarities may be based on one or more of make, model, year, driver behavior, maintenance history, drive age, driver sex, location, and the like.

The method 700 may proceed to 706, which includes adjusting fueling parameters based on network PBIB feedback. In this way, fueling parameters may be corrected without executing PBIB.

Returning to 702, if PBIB conditions are met, then the method 700 may proceed to 708, which includes activating a pump. As such, the pump may pressurize fuel from a fuel tank and deliver the fuel to a fuel rail. In one example, the pump is identical to HPP 214 of FIG. 2.

The method 700 may proceed to 710, which includes charging the fuel rail with fuel. In one example, the fuel rail is a high-pressure fuel rail. The high-pressure fuel rail may receive fuel until a threshold pressure is reached. During the charging, fuel injections from the fuel rail may not occur. In one example, the threshold pressure is a non-zero, positive number based on a number of injections desired to inject during the PBIB diagnostic for one PW.

The method 700 may proceed to 712, which includes deactivating the pump.

The method 700 may proceed to 714, which includes executing a transitional injection, skipping eight injectors, and firing a group of injectors at a first PW. The group of injectors may include two or more injectors. The injectors may be arranged on a same bank or different banks. Additionally or alternatively, the group of injectors may include all the direct injectors of the engine. The group of injectors may be fired an integer multiple number of times, wherein a final injection from the group of injectors is injected via the same injector that executed the transitional injection. The integer multiple refers to a symmetric, whole number injection pattern of the group of injectors such that each injector of the group injects an equal number of times. In one example, the injector used to fire the transitional injection may be the same injector used to fire the transitional injection for all other PWs used to learn the shape of the injector error. In one example, the injection pattern of method 700 further includes a skip injection pattern following the transitional injection. The skip injection pattern, which includes skipping injections from each of the injectors to be included in the group of injectors may be executed to allow an inter-injection period to be similar to a fire 1/skip 7 pattern as shown via one of the sets of FIG. 6C. In one example, the skip injection pattern is equal to a number of direct injectors of the engine. Thus, the skip injection pattern may be a skip 4, skip 6, skip 8, and so on. Firing all the injectors at the first PW, wherein the first PW is greater than the threshold PW (e.g., greater than or equal to 600 μs), may include firing each of the injectors one or more times. In one example, to reduce an effect of Gaussian noise, each injector may inject at least four times. By doing this, a ratio of Gaussian error in the average inter-injection FRP to a drop across 32 injections may be relatively small, such that a single FRP measurement may accurately represent an injector transfer function.

The method 700 may proceed to 716, which includes measuring an average FRP drop across all injectors. In one example, the average FRP drop total for the group of injectors is calculated via equation 6 below:

$$\overline{\Delta FRP}_{total} = \frac{1}{n}\sum_{m=1}^{n} x_m \tag{6}$$

In the present example, there may only be two FRP values used to determine the average drop in FRP including a first FRP prior to a first injection following the skip 8 and a final FRP following a last injection of the 32 injections. A single drop in FRP is computed from the difference of the two FRP (first and final) values. Thus, in the equation 3, n may be equal to 1.

The method 700 may proceed to 718, which includes determining an average FRP per injection. In one example, the average FRP per injection is determined via equation 7 below:

$$\overline{\Delta FRP}_{inj} = \frac{\overline{\Delta FRP}_{total}}{\# \text{ of injections}} \tag{7}$$

The total average drop in FRP over all injections is divided by the number of injections in the group to determine the average drop in FRP per injection. Thus, in one example, the total average drop in FRP is divided by 32 for each PW tested to determine the average drop in FRP per injection.

The method 700 may proceed to 720, which includes uploading the data to the network. In one example, uploading the data may include where a controller communicates with the network via a modem, router, or other internet connection device. The controller may send other data along with the average FRP drop per injection at the first PW, wherein the other data includes one or more of a vehicle make, model, year, driver behavior, maintenance history, drive age, driver sex, location, and the like.

The method 700 may proceed to 722, which includes determining if PBIB conditions are still met. If PBIB conditions are still met, then the method 700 may proceed to 724, which includes repeating steps 716-722 until all 61 PWs are learned. Thus, the error shape of a second PW may be learned following the first PW without executing a transitional injection. Additionally or alternatively, a skip 8 between group injections of the first PW and the second PW may be optionally executed or omitted. In one example, executing the skip 8 between the group of injections of the first PW and the second PW may increase accuracy. As described above, the 61 PWs may be spaced such that multiple PW errors are learned within a single period of the zig-zag shape. In one example, the PWs are 25 μs apart. In one example, additionally or alternatively, one or more of the injector errors may be provided by the network, thereby decreasing a number being executed by the engine independently.

If the PBIB conditions are no longer met, then the method 700 proceeds to 726, which includes determining if network data is available for PWs different than the first PW. Network data for other PWs may be available if PBIB was executed on another similar vehicle at a different PW value. The controller may communicate with the network via a modem, router, user mobile device or other internet device. Additionally or alternatively, the controller may communicate directly with other vehicles via a dedicated short-range communication (DSRC) network, vehicle-to-vehicle (V2V), and the like.

If network data is not available for different PWs, then the method 700 may proceed to 728, which includes maintaining current operating parameters. The method 700 may proceed to 730, which includes not adjusting fueling parameters based on the injector transfer function shape since the shape has not yet been learned.

Returning to 726, if network data is available, then the method 700 may proceed to 732, which includes determining if a difference between the first PW and a second PW is greater than or equal to a threshold difference. In one example, the threshold difference is based on a non-zero, positive number corresponding to a difference spanning one or more periodicities of the zig-zag shape of the injector transfer function. In one example, the threshold difference may be equal to at least two periodicities (e.g., 400 μs). As another example, the threshold difference may be equal to more than two periodicities.

If the difference is not greater than the threshold difference, then the method 700 may proceed to 728, which includes maintaining current operating parameters as described above.

If the difference is greater than or equal to the threshold difference, then the method 700 may proceed to 734, which includes learning a transfer function shape and adjusting fueling parameters based on a difference between the transfer function shape and a desired fueling shape. As described above, the adjustments may include increasing the PW in response to the difference resulting in the injector injecting too little fuel and decreasing the PW in response to the injector injecting too much fuel. The PW adjustment may be proportional to the difference between the actual fuel commanded and the intended fuel commanded.

In one example, the first and second PWs may provide a slope without learning the transfer function shape. That is to say, the slope may correspond to an overall fueling error occurring during the hold phase of the injector, wherein adjustments may be based on a difference between the actual slope and an intended slope of the injector. As more PBIB diagnostics are executed, the shape may be learned over time, which may provide more fine-tuning of the fueling parameters.

Turning now to FIG. 8, it shows a plot 800 illustrating injector transfer function shapes of a plurality of injectors. PW is plotted along the abscissa and deviation in injected fuel mass is plotted along the ordinate. Dashed lines illustrate example distances of peak-to-peak periods of the injector transfer function shapes. Dotted lines between the dashed lines correspond to 25 μs increments at which it may be desired to executed PBIB to learn an injector transfer function shape, which may be extrapolated for all injectors. As illustrated, the plot 800 begins at 600 μs, thus, the PWs prior to 600 μs, including the ballistic and transition periods, as shown in FIG. 3A, are not included. By doing this, the single shape learned for the hold phase of one injector may be learned and applied to all other injectors.

An injection pattern 850 is shown, wherein the injection pattern 850 may be executed at two or more of the dashed and dotted PWs to determine a slope and/or a shape of the deviation in injected fuel mass, interchangeably referred to above as the injector transfer function shape and/or the error shape. The injection pattern 850 includes where for the two given PWs, PW1 and PW2, the pump is turned on, the fuel rail is charged, and then the pump is shut off, similar to the injection patterns of FIGS. 6C and 6D. The injection pattern 850 further includes a transition injection. The transitional injection may be provided by any injector of the plurality of injectors. In the example of FIG. 8, the transitional injection is provided by the injector of cylinder index number 7. Following the transitional injection, the injection pattern 850 includes a skip 8, wherein injectors of cylinder index numbers 0-7 do not inject fuel. In one example, direct injections are not provided during the skip 8. Thus, in one example, the entry portion of the injection pattern 850 may include where an engine load is relatively low and direct injections are not desired. As such, fueling demands may be met via only the port-fuel injectors. In another example, the skip 8 may be omitted. As described above, the skip 8 is based on a number of direct injectors of the engine. Thus, for a V6 engine configuration with six direct injectors, the skip injection pattern may be a skip 6.

Following the skip 8, PBIB learning may begin with firing each of the plurality of injectors without skipping any injections at a first PW (PW1). Injections during the injection pattern 850 may be preceded by opposite or same cylinder bank injections. The plurality of injectors is fired multiple times, in this example, four each, however it may be greater than or less than four without departing from the scope of the present disclosure. As illustrated, the final injection of the injection pattern for the PW1 group injections matches the injector with which the transitional injection was executed. This way, both the inter-injection periods preceding and following the first group injections follow an injection from injector of cylinder index number 7 resulting in in-phase oscillations. Following the final injection, a skip 8 occurs in the example of FIG. 8 and is followed by another series of group injections at a second PW (PW2). Including the skip 8 between the two groups of injections may increase an accuracy of the learned error shape. However, as described above, the skip 8 may be omitted to increase a rate in which the error shape is learned. A single FRP drop may be measured for each group, including a first FRP prior to the first injection from the injector of cylinder index number 0 to a last FRP following the last injection from the injector of cylinder index number 7 for each of the first group of injections at PW1 and the second group of injections at PW2. Both the first FRPs prior to the first injection from the injector of cylinder index number 0 and last FRPs following the last injection from the injector of cylinder index number 7 follow injections from the injector of cylinder index number 7. This results in in-phase resonant oscillation which cancels out the bias error. The plurality of injections may reduce the relative error generated due to Gaussian noise. That is to say, a drop in FRP for a single injection may include a relatively large error, while a drop in FRP across the plurality of injections may spread the error over a greater number of injections, thereby decreasing a magnitude of the error relative to the single injection.

In some examples, different injection patterns may be used at different PWs, wherein results from the different injection patterns may be combined to learn the error shape or slope of the error shape. For example, the injection pattern 850 may include where PW1 is equal to 600 μs and PW2 is equal to 625 μs, the injection pattern 650 of FIG. 6C may be executed at 1000 μs, and the injection pattern 675 of FIG. 6D may be executed at 2000 μs. Data from each of the PWs may be used to determine the slope and/or a portion of the error shape wherein fueling adjustments may be executed based on a determined error. In another example, the injection pattern 850 may be modified to include only one PW or more than two PWs.

An example of a method, comprises adjusting a fuel injection parameter in response to a fuel rail pressure drop of a group of injectors at a first pulse-width. A first example of the method further includes where the first pulse-width is greater than a threshold pulse-width, wherein the threshold pulse-width corresponds to a pulse-width of a ballistic region and a transition region. A second example of the method, optionally including the first example, further includes where the first pulse-width is greater than or equal to 600 μs. A third example of the method, optionally including one or more of the previous examples, further includes where the first pulse-width corresponds to a hold phase of the group of injectors, wherein the group of injectors comprises direct injectors positioned to inject directly into a combustion chamber of an engine. A fourth example of the method, optionally including one or more of the previous examples, further includes where the fuel rail pressure drop is determined via firing an integer multiple of the group of injectors, wherein the integer multiple is greater than two. A fifth example of the method, optionally including one or more of the previous examples, further includes where the firing the integer multiple is preceded and followed by a skip injection pattern, wherein the skip injection pattern includes where the group of injectors are skipped and do not inject fuel. A sixth example of the method, optionally including one or more of the previous examples, further includes where the preceding skip injection pattern is preceded by a transitional injection, and wherein a last injection fired by the integer multiple is from an injector identical to an injector that fired the transitional injection.

An example of a system, comprises an engine, a first cylinder bank and a second cylinder bank comprising a plurality of cylinders, wherein each cylinder of the plurality of cylinders includes a direct injector configured to inject fuel directly therein and a port-fuel injector configured to inject fuel into an intake port thereof, and a controller with computer-readable instructions stored on non-transitory memory thereof that when executed cause the controller to execute a pressure-based injector balancing diagnostic in response to conditions, learn a first drop of a fuel rail pressure for a multiple integer number of injections of both the first cylinder bank and the second cylinder bank at a first pulse-width (PW), and adjust fueling parameters of the injections in response to a slope determined between the first drop of the first PW and a second drop of a second PW. A first example of the system further includes where a difference between the second PW and the first PW is greater than a threshold difference, wherein the threshold difference is based on a period of a deviation in injected fuel mass. A second example of the system, optionally including the first example, further includes where the instructions further enable the controller to learn a shape of an injector transfer function in response to a plurality of drops in the fuel rail pressure at a plurality of PWs, wherein each of the plurality of PWs is greater than or equal to a threshold PW, wherein the threshold PW is based on a ballistic region PW range and a transition region PW range. A third example of the system, optionally including one or more of the previous examples, further includes where a difference between each of the plurality of PWs is less than a period of the shape of the injector transfer function, wherein the period is based on a PW distance between peaks of the injector transfer function. A fourth example of the system, optionally including one or more of the previous examples, further includes where a portion of the plurality of drops in the fuel rail pressure at the plurality of PWs are retrieved from a network. A fifth example of the system, optionally including one or more of the previous examples, further includes where a portion of the plurality of drops in the fuel rail pressure are determined via an injection pattern comprising firing only one injector of only one cylinder of either the first cylinder bank or the second cylinder bank a plurality of times, the injection pattern further comprising skipping injections from all other injectors between injections of the only one injector. A sixth example of the system, optionally including one or more of the previous examples, further includes where the instructions further enable the controller to fire a transitional injection and skip injections of the first cylinder bank and the second cylinder bank prior to beginning the multiple integer number of injections. A seventh example of the system, optionally including one or more of the previous examples, further includes where the instructions further enable the controller to skip injections of the first cylinder bank and the second cylinder bank following the multiple integer number of injections.

An embodiment of a method for an engine comprising a controller with instructions stored on memory that cause the controller to execute the method, the method, comprising determining a shape of an injector transfer function based on one or more of a drop in fuel rail pressure (FRP) for a single injector at a plurality of pulse-widths (PWs) greater than or equal to a threshold PW and a drop in FRP for a group of injectors at the plurality of PWs, and adjusting PWs provided to the group of injectors based on the shape of the injector transfer function. A first example of the method further includes where the drop in FRP for the single injectors at the plurality of PWs further includes skipping injections from other injectors of an engine, wherein skipping injections includes deactivating the other injectors and not injecting fuel therefrom. A second example of the method, optionally including the first example, further includes where the drop in FRP for the group of injectors further includes firing a transitional injection, skipping all injections from the group of injectors for an engine cycle, firing the group of injectors an integer number of times, and skipping all injections from the group of injectors following a last injection of the group of injectors. A third example of the method, optionally including one or more of the previous examples, further includes where the single injector is one injector of the group of injectors, wherein the group of injectors are direct injectors of cylinders of the engine. A fourth example of the method, optionally including one or more of the previous examples, further includes where adjusting PWs further includes increasing a PW in response to an actual amount of fuel being injected being less than a commanded amount of fuel and decreasing the PW in response to the actual amount of fuel being injected being greater than the commanded amount.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting a fuel injection parameter in response to a fuel rail pressure drop of a group of injectors at a first pulse-width, wherein the fuel rail pressure drop is determined via firing an integer multiple of the group of injectors, wherein the integer multiple is greater than two, and wherein the firing the integer multiple is preceded and followed by a skip injection pattern, wherein the skip injection pattern includes where the group of injectors are skipped and do not inject fuel.

2. The method of claim 1, wherein the first pulse-width is greater than a threshold pulse-width, wherein the threshold pulse-width corresponds to a pulse-width of a ballistic region and a transition region.

3. The method of claim 1, wherein the first pulse-width is greater than or equal to 600 μs.

4. The method of claim 1, wherein the group of injectors comprises direct injectors positioned to inject directly into a combustion chamber of an engine.

5. The method of claim 1, wherein the preceding skip injection pattern is preceded by a transitional injection, and wherein a last injection fired by the integer multiple is from an injector identical to an injector that fired the transitional injection.

6. A system, comprising:
an engine;
a first cylinder bank and a second cylinder bank comprising a plurality of cylinders, wherein each cylinder of the plurality of cylinders includes a direct injector configured to inject fuel directly therein and a port-fuel injector configured to inject fuel into an intake port thereof; and
a controller with computer-readable instructions stored on non-transitory memory thereof that when executed cause the controller to:
execute a pressure-based injector balancing diagnostic in response to conditions;
learn a first drop of a fuel rail pressure for a multiple integer number of injections of both the first cylinder bank and the second cylinder bank at a first pulse-width (PW); and
adjust fueling parameters of the injections in response to a slope determined between the first drop of the first PW and a second drop of a second PW.

7. The system of claim 6, further comprising where a difference between the second PW and the first PW is greater than a threshold difference, wherein the threshold difference is based on a period of a deviation in injected fuel mass.

8. The system of claim 6, wherein the instructions further enable the controller to learn a shape of an injector transfer function in response to a plurality of drops in the fuel rail pressure at a plurality of PWs, wherein each of the plurality of PWs is greater than or equal to a threshold PW, wherein the threshold PW is based on a ballistic region PW range and a transition region PW range.

9. The system of claim 8, wherein a difference between each of the plurality of PWs is less than a period of the shape of the injector transfer function, wherein the period is based on a PW distance between peaks of the injector transfer function.

10. The system of claim 8, wherein a portion of the plurality of drops in the fuel rail pressure at the plurality of PWs are retrieved from a network.

11. The system of claim 8, wherein a portion of the plurality of drops in the fuel rail pressure are determined via an injection pattern comprising firing only one injector of only one cylinder of either the first cylinder bank or the second cylinder bank a plurality of times, the injection pattern further comprising skipping injections from all other injectors between injections of the only one injector.

12. The system of claim 6, wherein the instructions further enable the controller to fire a transitional injection and skip injections of the first cylinder bank and the second cylinder bank prior to beginning the multiple integer number of injections.

13. The system of claim 6, wherein the instructions further enable the controller to skip injections of the first cylinder bank and the second cylinder bank following the multiple integer number of injections.

14. A method for an engine comprising a controller with instructions stored on memory that cause the controller to execute the method, the method, comprising:
determining a shape of an injector transfer function based on one or more of a drop in fuel rail pressure (FRP) for a single injector at a plurality of pulse-widths (PWs) greater than or equal to a threshold PW and a drop in FRP for a group of injectors at the plurality of PWs, wherein the drop in FRP for the single injectors at the plurality of PWs further includes skipping injections from other injectors of an engine, wherein skipping injections includes deactivating the other injectors and not injecting fuel therefrom; and adjusting PWs provided to the group of injectors based on the shape of the injector transfer function.

15. The method of claim 14, wherein the single injector is one injector of the group of injectors, wherein the group of injectors are direct injectors of cylinders of the engine.

16. The method of claim 14, wherein adjusting PWs further includes increasing a PW in response to an actual amount of fuel being injected being less than a commanded amount of fuel and decreasing the PW in response to the actual amount of fuel being injected being greater than the commanded amount.

* * * * *